(12) United States Patent
Gray et al.

(10) Patent No.: US 7,876,078 B2
(45) Date of Patent: Jan. 25, 2011

(54) SWITCHING POWER SUPPLY WITH NEAR ZERO SUPPLY CURRENT IN LIGHT-LOAD OPERATION

(75) Inventors: Richard Landry Gray, Saratoga, CA (US); Steven Huynh, Santa Clara, CA (US)

(73) Assignee: Active-Semi, Inc. (VG)

( * ) Notice: Subject to any disclaimer, the term of this patent is extended or adjusted under 35 U.S.C. 154(b) by 0 days.

(21) Appl. No.: 12/586,812

(22) Filed: Sep. 28, 2009

(65) Prior Publication Data

US 2010/0066332 A1 Mar. 18, 2010

Related U.S. Application Data

(63) Continuation of application No. 11/544,873, filed on Oct. 7, 2006, now Pat. No. 7,667,443.

(60) Provisional application No. 60/725,143, filed on Oct. 11, 2005.

(51) Int. Cl.
 *G05F 1/00* (2006.01)
(52) U.S. Cl. ...................... 323/282; 323/266
(58) Field of Classification Search .......... 323/282, 323/283, 284, 285, 266, 267, 271
See application file for complete search history.

(56) References Cited

U.S. PATENT DOCUMENTS

| | | | |
|---|---|---|---|
| 5,999,421 A | 12/1999 | Liu | 363/21.15 |
| 6,294,904 B1 | 9/2001 | Hirst | 323/283 |
| 2002/0121883 A1* | 9/2002 | Bartenschlager et al. | 323/269 |
| 2002/0158612 A1* | 10/2002 | Genest et al. | 323/274 |
| 2003/0222629 A1 | 12/2003 | Inoue et al. | 323/224 |
| 2004/0239301 A1* | 12/2004 | Kobayashi | 323/284 |
| 2005/0046399 A1 | 3/2005 | Gan et al. | 323/222 |
| 2005/0258811 A1 | 11/2005 | Matsuo et al. | 323/282 |

* cited by examiner

*Primary Examiner*—Bao Q Vu
*Assistant Examiner*—Nguyen Tran
(74) *Attorney, Agent, or Firm*—Imperium Patent Works; Zheng Jin; Darien K. Wallace

(57) ABSTRACT

Techniques for near zero light-load supply current in switching power supply are described. In one embodiment, a switching power supply comprises sub-circuits, a capacitor/inverter circuit, and a standby control circuit. The sub-circuits comprise a feedback resistor that supplies a fraction of an output voltage of the power supply, an integrator that provides an integrator output, a comparator that provides a pulse width modulated signal, a switching element that receives the pulse width modulated signal and modulates current such that the power supply provides a regulated voltage, and a monitoring circuit that provides a logic low signal when the pulse width modulated signal is absent over a period of time. The standby control circuit disables the sub-circuits when the logical low signal is detected permitting the switching power supply to operate at a minimum current, an re-enables the sub-circuits when an out of regulation signal from the capacitor/inverter circuit is detected.

19 Claims, 24 Drawing Sheets

SCHEMATIC AND DESCRIPTION OF THE
AUXILIARY INTEGRATOR/COMPARATOR

Top level Test Circuit

| STATE OR TRANSITION | SIGNAL NAME S1 | S0 | 10mS DONE | 20uS DONE | REFOK | GO | INT_OUT | NG STOP | RES ON | REF ON | SW | AZ | HOT | COLD | STDBY | NORM | START 10mS | START 20uS | CLK OFF | CLR NG |
|---|---|---|---|---|---|---|---|---|---|---|---|---|---|---|---|---|---|---|---|---|
| NORM | 0 | 0 | X | X | X | X | X | 0 | 1 | 1 | LAST | X | 0 | 0 | 0 | 1 | 0 | 0 | 0 | 0 |
| NORM_TO_STDBY | 0 | 0 | 1 | X | X | X | X | 1 | | | | | | | | | | | | |
| STDBY | 0 | 1 | 0 | X | X | 0 | X | X | 0 | 0 | TOGGLE | 0 | 0 | 0 | 1 | 0 | 1 | 0 | 1 | 1 |
| STDBY_TO_COLD | 0 | 1 | 1 | X | X | 0 | X | X | | | | 0 | 0 | 1 | | | | | | |
| STDBY_TO_HOT | 0 | 1 | X | X | X | 1 | X | X | | | | 0 | 1 | 0 | | | | | | |
| HOT | 1 | 1 | X | X | 0 | X | X | X | 0 | 1 | LAST | 1 | 1 | 0 | 0 | 0 | 0 | 0 | 0 | 1 |
| HOT_TO_NORM | 1 | 1 | X | X | 1 | X | X | X | | | | | | | | | | | | |
| COLD | 1 | 0 | X | 0 | 0 | 0 | 0 | X | 1(a) | 1 | LAST | 1 | 0 | 1 | 0 | 0 | 0 | 1(a) | 1 | 1 |
| COLD_TO_STDBY | 1 | 0 | X | 1 | 1 | 0 | X | X | | | | | | | | | | | | |
| COLD_TO_HOT | 1 | 0 | X | X | X | 1 | X | X | | | | | | | | | | | | |
| COLD_TO_NORM | 1 | 0 | X | 1 | X | X | 1 | X | | | | | | | | | | | | |

FIG. 16

| SIGNAL NAME | SIGNAL DESCRIPTION |
|---|---|
| S1 | OUTPUT OF ONE STATE MACHINE FF |
| S0 | OUTPUT OF ONE STATE MACHINE FF |
| 10mS_DONE | 10mS TIME PERIOD COMPLETED |
| 20uS_DONE | 20uS TIME PERIOD COMPLETED |
| REFOK | REFERENCE OK SIGNAL (MAY NOT BE FULLY SETTLED OUT AT THIS POINT) |
| GO | AUX COMPARATOR OUTPUT – GIVES THE STATUS OF THE OUTPUT VOLTAGE DURING STDBY MODE |
| INT_OUT | NORM MODE INTEGRATOR OUTPUT. IN THIS CASE USED AS A COMPARATOR |
| NG_STOP | GOES HIGH WHEN THE NGATE STOPS SWITCHING FOR A CERTAIN TIME |
| | |
| RES_ON | TURNS ON THE FEEDBACK RESISTOR |
| REF_ON | TURNS ON THE REFERENCE |
| SW | OUTPUT A TOGGLE FF THAT DETERMINES WHICH HALF OF THE AUX INTEGRATOR IS BEING USED |
| AZ | WHEN HIGH PUTS PART OF THE AUX INTEGRATOR INTO ITS AUTO-ZERO MODE |
| HOT | HIGH DURING THE HOT STATE (REF_ON_HOT) |
| COLD | HIGH DURING THE COLD STATE (REF_ON_COLD) |
| STDBY | HIGH DURING THE STDBY STATE (STANDBY) |
| NORM | HIGH DURING THE NORM STATE (NORMAL) |
| CLK_OFF | TURNS OFF THE CLOCK |
| CLR_NG | RESETS THE CIRCUIT THAT CHECKS TO SEE IF THE NMOS GATE IS SWITCHING |

FIG. 17

SWITCHING POWER SUPPLY WITH NEAR ZERO SUPPLY CURRENT IN LIGHT-LOAD OPERATION

CROSS REFERENCE TO RELATED APPLICATIONS

This application is based on and hereby claims priority under 35 U.S.C. 119 from U.S. provisional application No. 60/725,143, entitled "Switching regulator with near zero supply current in light load operation," filed on Oct. 11, 2005, the subject matter of which is incorporated herein by reference.

This application is a continuation of, and claims priority under 35 U.S.C. §120 from, nonprovisional U.S. patent application Ser. No. 11/544,873 entitled "System and Method for Near Zero Light-load Supply Current in Switching Regulator," filed on Oct. 7, 2006 now U.S. Pat. No. 7,667,443, the subject matter of which is incorporated herein by reference.

TECHNICAL FIELD

The present invention relates generally to any regulated power supply. More particularly, the invention relates to switching regulators with very low supply current designs under light load operation.

BACKGROUND

FIG. 1 illustrates the basic external topology of an exemplary 3-pin boost converter.

To better understand the context of the present invention it may be helpful to the reader to set forth the basic boost circuit operations of interest in the present embodiment, whereby some simplified schematics of conventional boost operation in the continuous mode and the discontinuous mode are shown in FIGS. 2 and 3, respectively. In particular, FIG. 2 illustrates a simplified view, with the control circuitry and switches omitted, of a conventional model for the two states of typical boost mode converter in the continuous conduction mode of operation.

FIG. 3 illustrates a simplified view, with the control circuitry and switches omitted, of a conventional model for the three states of typical boost mode converter in the discontinuous conduction mode of operation.

FIG. 4 shows the simplified control structure of an exemplary boost regulator, in accordance with an embodiment of the present invention. An output voltage is sensed through a resistor divider RF1 and RF2, and the difference between the divided voltage and a reference voltage is integrated and fed into a summing comparator. An integrated error voltage is summed with a signal indicative of an inductor current as well as a compensating voltage ramp. The output of the summing comparator forms a pulse width modulated control (PWM) signal that turns a large NFET on and off. When the NFET is on, the NFET allows current to ramp up in an external inductor; when the NFET is off, the current in the inductor tends to flow in the same direction, which drives the drain of the NFET high. A commutating PFET device turns on when its drain voltage and the NFET drain and one side of the inductor exceed the voltage at the output. In continuous mode conduction, where the inductor current is never at zero, the PFET and the NFET are alternately in the on position. During discontinuous mode conduction where the inductor current may be zero, both the PFET and the NFET may both be simultaneously in the off position for part of the cycle. Circuitry inside a LOGIC and DRIVERS block prevents the PFET from allowing current to flow backwards from a capacitor Cout into a voltage source Vin through the inductor.

In the circuit shown, as the load current is decreased, the circuit will move from continuous mode operation into discontinuous mode operation and finally, due to the minimum current pulse limit inherent with conventional leading edge blanking, pulses will start to be skipped; this means that a clock edge will occur but the PWM comparator will prevent a new cycle from starting. After a certain number of pulses have been skipped without a new cycle being initiated, and when the integrator circuit indicates that the output is reasonably close to its regulated value or equivalently, if a certain time passes without a new cycle being initiated and the integrator circuit indicates that the output is reasonably close to its regulated value, the circuit can move into a standby operation mode, the STDBY state.

In the standby (STDBY) state all nonessential portions of the circuit are typically shutdown. Typically, essential circuits that stay active include, without limitation, an auxiliary control circuit and a timing circuit. Certain digital circuits may still operate; however, for circuit implemented using CMOS technology, the supply current requirement of these digital circuits is generally almost zero. Accordingly, voltage reference, integrator, feedback resistor, PWM comparator, oscillator, ramp generator and inductor current sense circuitry are all preferably turned off and, as such, require essentially zero supply current in the STDBY state.

Switching regulators, like those described above, are often used in power control circuits for battery operated hand-held devices. These regulators continue to be driven by two forces: low power consumption and small size. Yet these circuits must be able to provide regulated power from no load up to their full rated load at all times. At very light loads, efficiency may drop off because the supply currents used to keep the power control circuits running become a significant portion of current supplied to the load. Since the total power draw during this situation is very low, this may not be perceived as a critical issue. However, this situation is very relevant because these light load operating modes may be active for very long periods of time. Eventually these light load operating modes can consume a large amount of the energy stored in a battery.

Various schemes have been invented over the years that allow switching power supplies to reduce their power consumption during periods of light loading. Many of these schemes work by sending out bursts of switching pulses separated by long periods of inactivity when portions of the circuit can be turned off in order to reduce the current required to keep the control circuit active. It is important that the control circuitry retains enough of its original operation so that the circuitry can respond to a sudden increase in output loading without falling out of regulation. Schemes where the operation is degraded during these special light loading modes, such that the transient response of the circuit allows the output voltage to fall out of regulation, are of questionable value.

While most of these schemes might work well at light load currents most of these schemes are not suitable for situations where the load current requirement is almost zero, for instance, without limitation, where the portable hand-held device is turned off but it still needs to keep a CMOS logic circuit in a particular state without switching so that it can remember its state for the next time the device is turned on. In these situations any supply current that is required by the power control circuitry that is more than the self-leakage current of the battery powering the hand-held device would be too much.

In view of the foregoing, there is a need for a power control circuit that can maintain itself in an operating condition, ready to respond to increased loading at any moment, with a small supply current rating, for example, without limitation, a supply current of less than 1 μA.

SUMMARY

To achieve the forgoing and other objects in accordance with the purpose of the invention, a variety of techniques to regulate the output voltage of a switching regulator are described.

In one embodiment, a method for operating a voltage regulator at a regulated voltage in a standby mode with a minimum current draw is described. The method includes the steps of operating the voltage regulator in a normal mode, monitoring an output of the voltage regulator, the monitoring including the step of generating an error signal indicating a difference between the output and the desired regulated voltage, generating a control signal at least in part based on the error signal, the control signal actively controlling the output of the regulator, monitoring the control signal over a first period of time, the monitoring activating a regulated signal when the control signal is inactive for the first period of time, and placing the voltage regulator in the standby mode when the regulated signal is active and the error signal indicates the output is substantially at the regulated voltage wherein portions of the voltage regulator are disabled permitting the voltage regulator to operate at the minimum current draw.

In another embodiment, a voltage regulator operated at a regulated voltage in a standby mode with a minimum current draw is described. The voltage regulator includes a means for monitoring an output of the voltage regulator, a means for controlling the output, a means for monitoring the controlling, and a means for placing the voltage regulator in the standby mode when the means for controlling indicates a period of inactivity.

In yet another embodiment, a system for operating a voltage regulator at a regulated voltage in a standby mode with a minimum current draw is described. The system includes a control unit operating the voltage regulator in at least a normal mode, a voltage reference generator having a reference output, an error circuit monitoring an output of the voltage regulator, the error circuit comprising an error signal output indicating a difference between the output and the reference output, an output control unit generating a control signal at least in part based on the error signal output, the control signal actively controlling the output of the voltage regulator, a control signal monitoring unit monitoring the control signal over a first period of time, the control signal monitoring unit comprising a regulated signal output that is active when the control signal is inactive for the first period of time, and a standby control unit for placing the voltage regulator in the standby mode when the regulated signal output is active and the error signal indicates the output is substantially at the regulated voltage wherein portions of the voltage regulator including the voltage reference generator, the error circuit, the output control unit, and the control signal monitoring unit are disabled permitting the voltage regulator to operate at the minimum current draw.

In a further embodiment, a switching power supply circuit is shown. The power supply circuit includes sub-circuits including a voltage reference generator for providing a voltage reference, a feedback resistor for sensing an output voltage of the power supply, the feedback resistor supplying a fraction of the output voltage, an integrator for integrating over time a difference between the reference voltage and the fraction of the output voltage, the integrator providing an integrator output, a voltage ramp generator providing a voltage ramp, a comparator for comparing the integrator output and the voltage ramp, the comparator providing a pulse width modulated signal a switching element receiving the pulse width modulated signal, the switching element modulating current through an inductor in order to provide a regulated output voltage, and a monitoring circuit for monitoring the pulse width modulated signal over a period of time, the monitoring circuit providing a logical low signal when the pulse width signal is absent over the period of time, a capacitor/inverter circuit comprising an inverter, a switch, and a capacitor connected to an input of the inverter and the switch, the switch being operative to allow a voltage to be stored on the capacitor, the voltage being indicative of the regulated output voltage, the inverter comprising a signal output, the signal output providing an out of regulation signal when a difference between the voltage and the regulated voltage is sensed and the switch is inoperative, and a standby control circuit comprising disabling circuits, the disabling circuits disabling the sub-circuits when the logical low signal is detected permitting the switching power supply circuit to operate at a minimum current, a switch control circuit controlling at least the switch, the switch control circuit controlling the switch to be inoperative when the logical low signal is detected, and enabling circuits, the enabling circuits re-enabling the sub-circuits when the out of regulation signal is detected allowing the switching power supply to provide the regulated output.

Other embodiments and advantages are described in the detailed description below, which should be read in conjunction with the accompanying drawings. This summary does not purport to define the invention. The invention is defined by the claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 16 shows a signal table for the state machine of FIG. 15. The conditions of the control signals are given for each state as well as the signal conditions required to move the machine from one state to the other;

FIG. 17 is a list and description of the various signals in the state machine;

FIG. 20 shows an exemplary timing diagram for STDBY operation where the output is always over regulation. FIG. 21 shows an exemplary timing diagram for STDBY operation where the output drifts under regulation. FIG. 22 shows an exemplary timing diagram for STDBY operation where the output drops out of regulation due to an external load step;

Unless otherwise indicated, illustrations in the figures are not necessarily drawn to scale.

DETAILED DESCRIPTION

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

It is to be understood that any components or exact values indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 1:
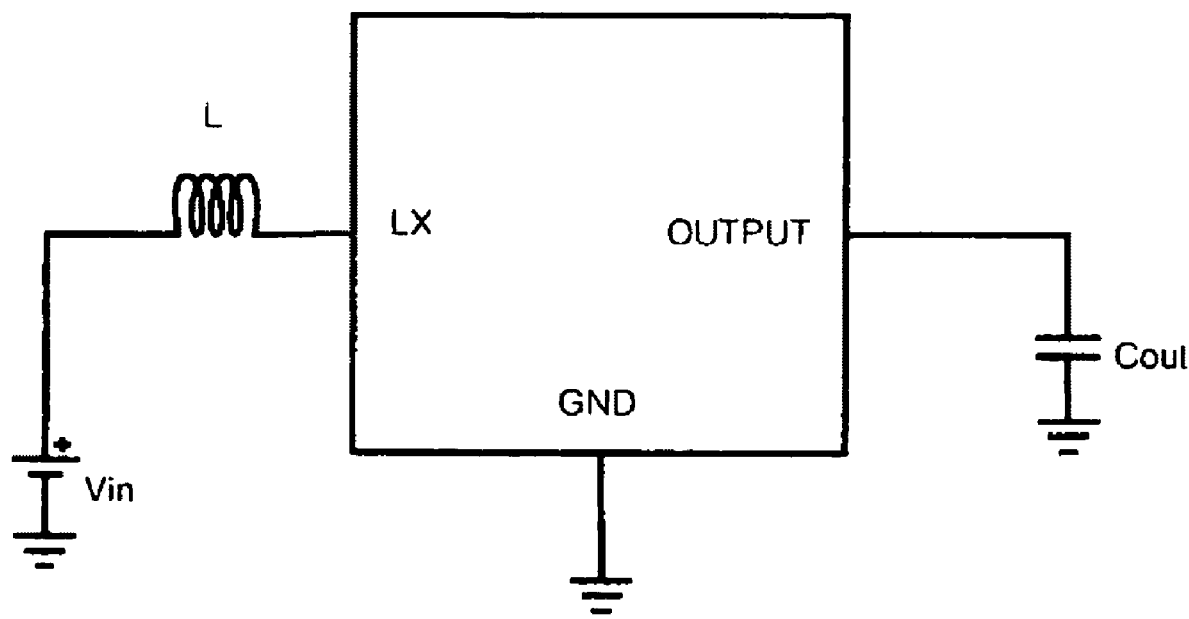
FIG. 1 illustrates the basic external topology of an exemplary 3-pin boost converter.
Figure 2:
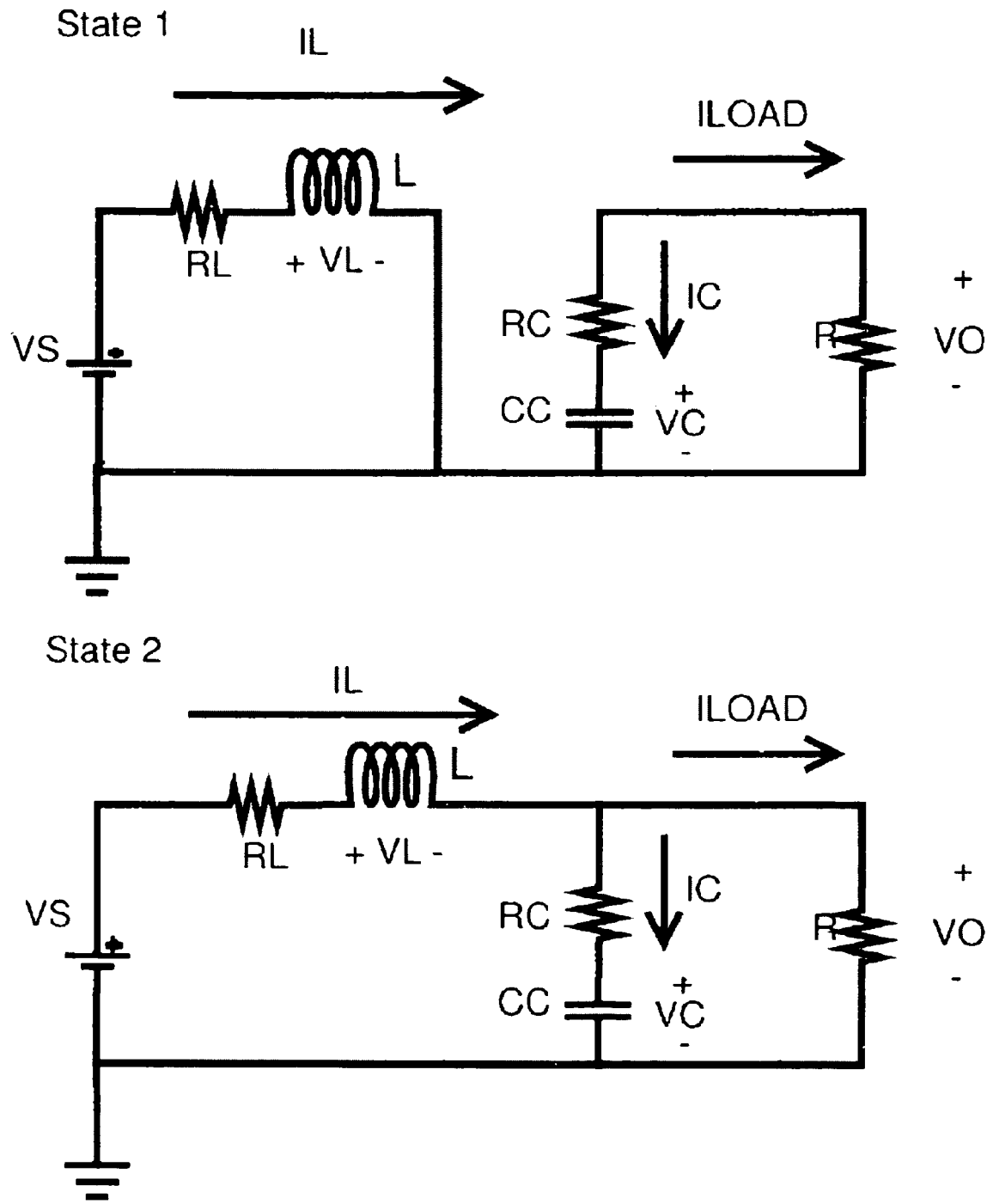
FIG. 2 illustrates a simplified view, with the control circuitry and switches omitted, of a conventional model for the two states of typical boost mode converter in the continuous conduction mode of operation.
Figure 3:
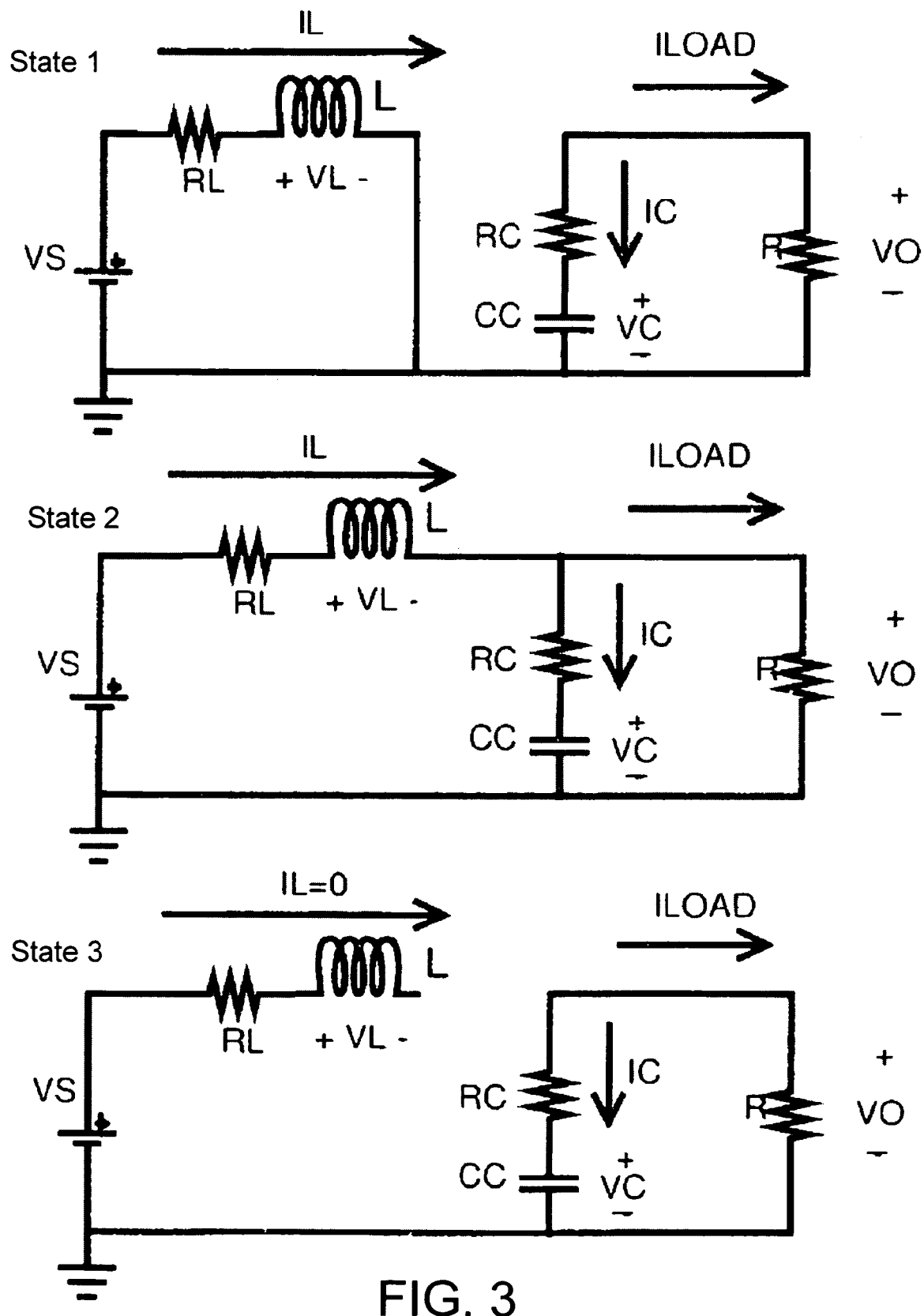
FIG. 3 illustrates a simplified view of the three states of a conventional boost mode converter operating in the discontinuous mode of operation.
Figure 4:
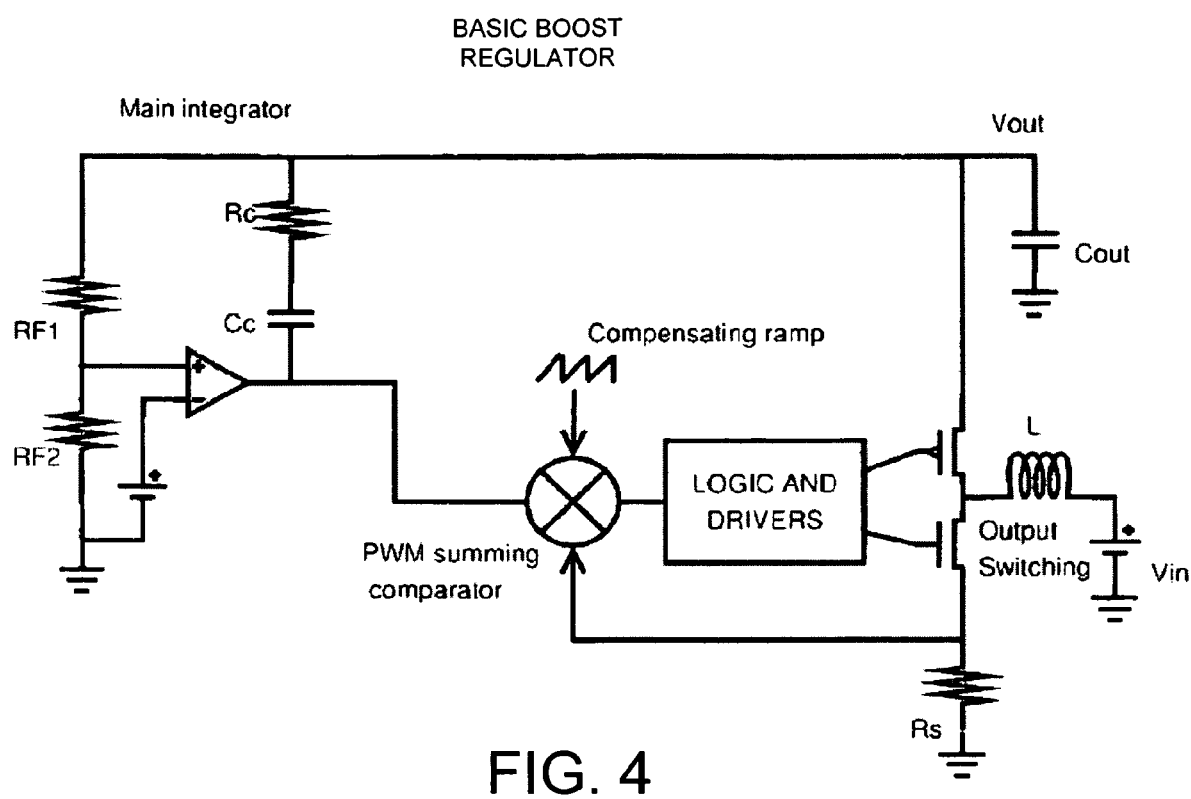
FIG. 4 shows the simplified control structure of an exemplary boost regulator, in accordance with an embodiment of the present invention.

As will be described in some detail below, some embodiments of the present invention provide power supply switching circuitry that can turn itself off during periods of essentially zero loading without requiring the current necessary to keep a voltage reference, feedback resistor and comparator active yet maintain enough of the circuit's original operation to respond to every possible transient loading change (within the specification of the device). Those skilled in the art will recognize that embodiments of the present invention may be applied to many types of switching power supply circuits, such as, but not limited to, buck, boost, flyback, and forward converters. There is no reasons that the technique could not be applied effectively to regulator circuits that do not switch such as linear regulators and any type of circuit that has to provide a regulated output voltage that, at times, may have almost zero load current The following embodiment is described as applied to a synchronous boost switching regulator, but similar techniques may be configured into a buck switching regulator. In one aspect, using techniques described in the context of an integrated circuit boost converter enables the circuit to be packaged as a 3-pin device. The supply current required to operate the boost converter during zero or light load modes is almost negligible such that the circuit can be left on constantly in many practical implementations. Thus, in such cases there is generally no need for a control pin to signal the circuit to turn on or off. Without the necessity of the control pin to enable and disable the device, the boost function can be simply implemented with a GND pin, an OUTPUT pin and an LX pin to connect to an inductor, as shown in FIG. 1.

The preferred embodiment, without limitation, of the present invention is that of a current mode synchronous boost scheme with slope compensation.

Figure 5:
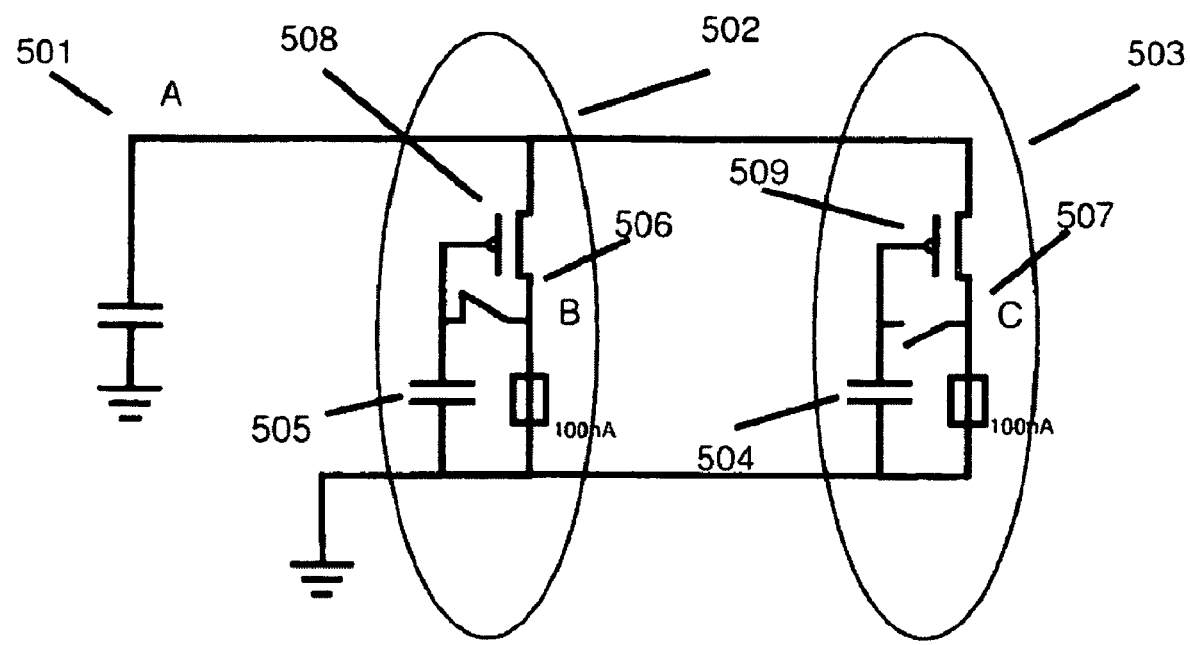
FIG. 5 shows a simplified schematic view of an exemplary auxiliary integrator/comparator and a description of the operation of the integrator/comparator, in accordance with an embodiment of the present invention.

FIG. 5 shows a simplified schematic view of an exemplary auxiliary integrator/comparator and a description of the operation the integrator/comparator, in accordance with an embodiment the present invention. In the Figure, a node A (501) is the output of a switching regulator. An inverter B (502) is shown in the auto-zero configuration so the voltage at the input and output of inverter B is: $V(B)=V(A)-V_{tp}$, where $V_{tp}$ is the PMOS threshold plus enhancement voltage, and V(A) is an output voltage of a switching regulator as previously mentioned. The outputs of inverter B and C are denoted 506 and 507 respectively. An inverter C (503) senses output voltage V(A) that a capacitor (504) for inverter C charges during a previous auto-zeroing cycle. Capacitor 504 has one plate permanently connected to the gate of the PMOS inverting device, 509. Inverter B (502) also has a capacitor, 505, with one plate permanently connected to the gate of its PMOS transistor, 508. The last known regulated output voltage is represented by a voltage stored on one of two capacitors 504 and 505. The voltages on these capacitors are indicative of the output voltage, but they are not necessarily the actual output voltage due to the non-zero value of the PMOS threshold voltages. Two capacitors are used so that one is always sensing the output voltage even while the other capacitor may be put into an auto-zeroing configuration, as shown in FIG. 5. Inverter C (503) compares an old value of V(A) to a new value of V(A). The old value of V(A) is the value of V(A) at the instant that inverter C went from the auto-zero mode to the sensing mode for example, without limitation, when a switch C is opened. The old value of V(A) is denoted as V(A)old. The present or new value of V(A) is denoted as V(A)new. If V(A)new>V(A)old, V(C) increases, and if V(A)new<V(A)old, V(C) decreases. In order for the comparison to be meaningful to the converter, V(A)old must be within the tolerance of the desired output voltage specification at the time its last auto-zero cycle was ended, and it is for that reason that the circuit does not enter into the STDBY state until internal circuitry indicates that the output is neither over nor under the intended regulation voltage.

When the circuit has been in the STDBY state, at a predetermined interval, for example, without limitation, every 10 ms, the circuit will temporarily move out of STDBY state and into another state wherein the voltage reference, the integrator and the feedback resistor are turned back on. The feedback resistor is preferably turned on after the voltage reference settles, in order to minimize supply current even further. In the present embodiment, the integrator compensating RC network is not connected to the integrator in order that its response time may be fast enough so that the state of the integrator output can be used to quickly indicate if the regulator output is under its regulated value. In the present embodiment, after waiting a sufficient time for the reference to stabilize, the feedback resistor is turned on and the output of the integrator, now acting as a comparator, is polled to see if the output has fallen below regulation. If the circuit is out of regulation, it moves immediately into a normal mode of operation, the NORM state, until the output is again in regulation. If the circuit is within regulation, the unused capacitor (505) of the auxiliary control circuit is auto-zeroed for a short time and the circuit is once again put into the STDBY state. However, in this instance, the roles of the recently auto-zeroed capacitor (505) and the output voltage sensing capacitor (504) are switched in order to refresh any charge that might have leaked off of the sensing capacitor during the previous STDBY state. It should be noted that the roles of 504 and 505 play are not generally fixed and they switch at the beginning of every STDBY state (see state diagram FIG. 6). In FIG. 5, capacitor 504 is used as the output voltage sensing cap while capacitor 505 is shown in its auto-zero configuration, however, after the next STDBY state their roles will be reversed.

At the end of any STDBY interval where the output has remained in regulation, the circuit progresses to another state (to be described fully below) whereby switch B (in the case of FIG. 5) closes for a period sufficient for the capacitor to charge to equilibrium after which switch B will reopen. The time interval used in the present embodiment is on the order of 50 uS, but those skilled in the art will readily calculate the appropriate time intervals for any particular design. At the point where switch B reopens, inverter B becomes the device used to sense the output regulation and inverter C becomes unused until it is time for inverter C to be auto-zeroed preparatory to taking over the output monitoring function from inverter B. This process repeats itself over and over as long as the output remains within regulation. In the present embodiment, the only circuits that require current during the STDBY state are one inverter for the sensing capacitor, a 10 ms timer, a circuit to produce the bias currents, and some current to auto-zero the unused capacitor for a very short time. During the STDBY interval if the output of the regulator is subjected to a sudden load step, the output voltage of the regulator (V(A) in this case) will drop, which immediately causes either a node B or a node C, depending on which one is being used to sense the output voltage at the moment, to fall as well. Other portions of the circuit, to be described below, detect when node B or node C falls and instruct the control circuitry to move out of the STDBY state and back into the NORM state of operation.

Because of the finite amount of time required for some internal sub-circuits to settle to their final values after being turned on, it is not generally possible for the circuit to move directly from the STDBY state into the NORM state. An intermediate state is required in order to provide regulation while the circuit transactions from STDBY to NORM. This intermediate state, called REF_ON_HOT, is described in more detail below.

DETAILED DESCRIPTION OF SOME OPERATIONAL STATES

Figure 6:
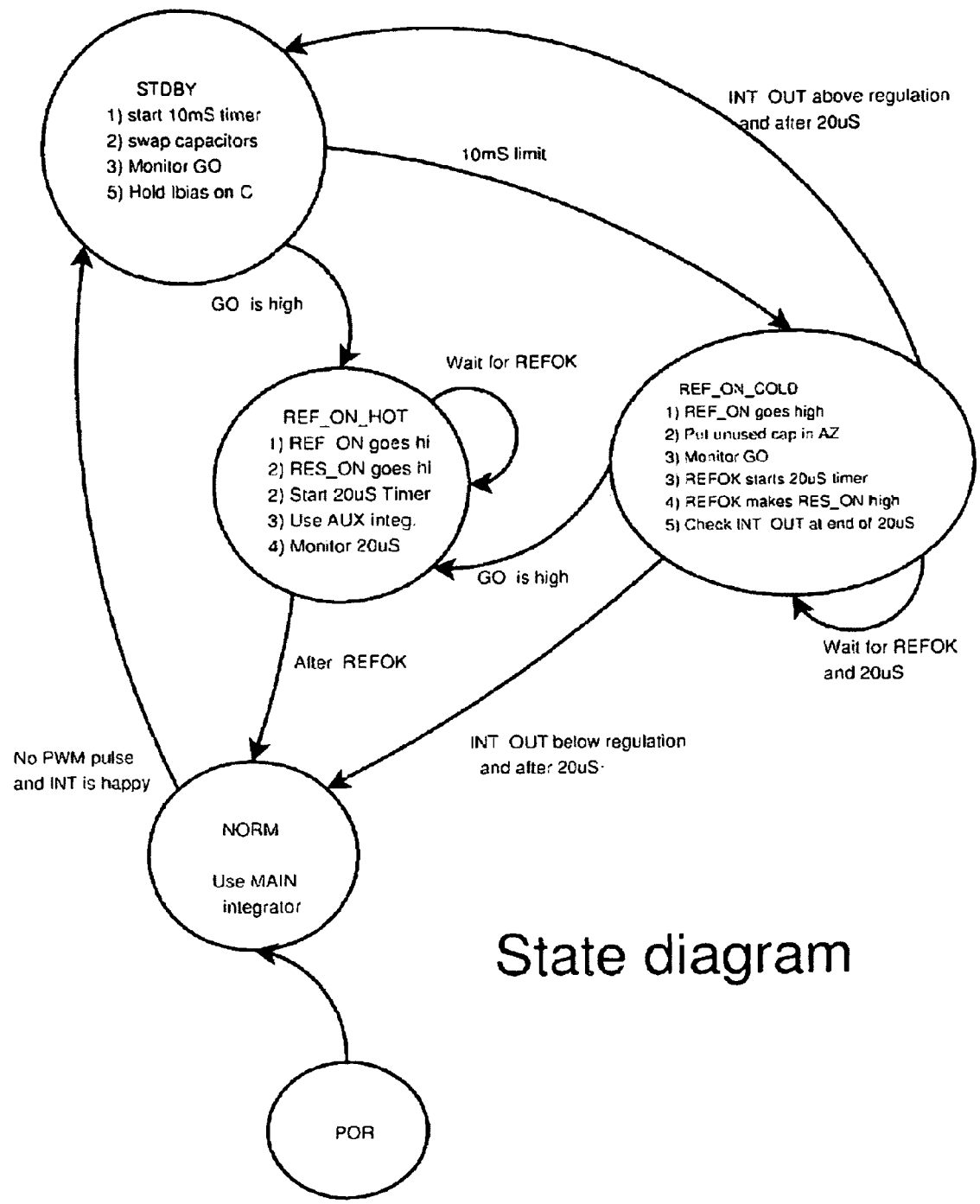
FIG. 6 shows a state diagram of an exemplary switching regulator system, in accordance with an embodiment of the present invention.

To better understand the preceding embodiment description an exemplary state diagram of the present system is illustrated in the FIG. 6. Each state corresponds to a particular topological connection of the circuit, which is shown by way of example in FIGS. 7 through 10. The list of shown states and their areas of operation follow.

Figure 7:
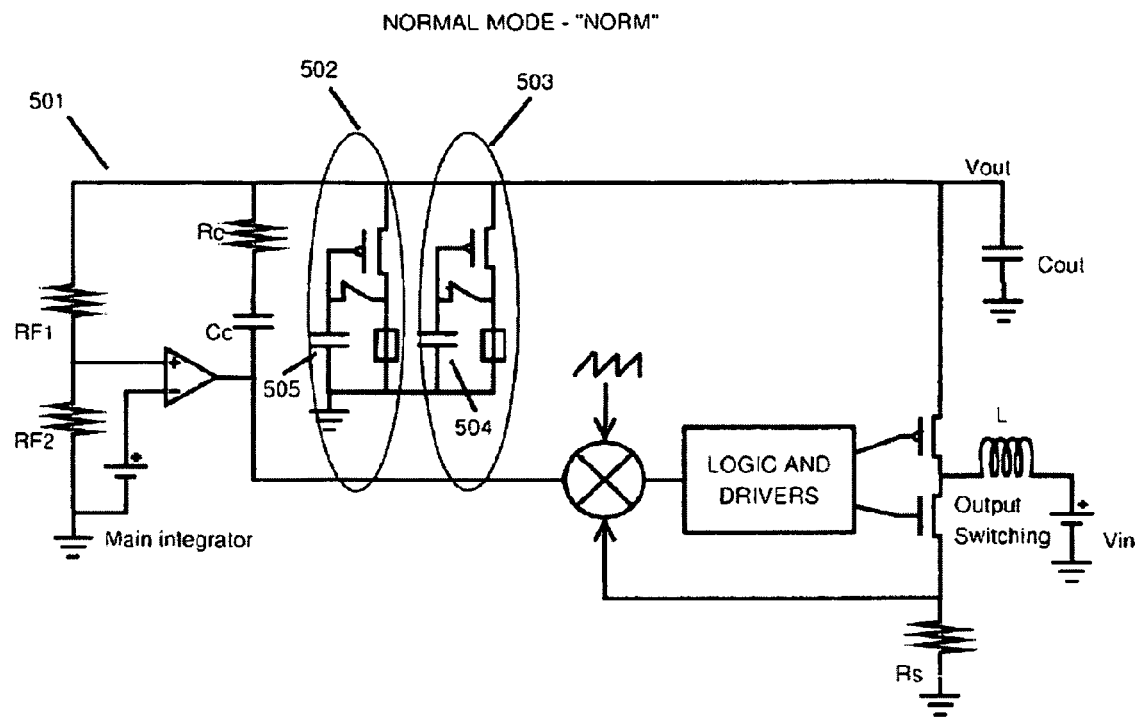
FIG. 7 shows a simplified schematic view of an exemplary switching regulator system in the normal mode of operation, according to an embodiment of the present invention.

FIG. 7 shows a simplified schematic view of an exemplary switching regulator system in the NORM mode of operation, according to an embodiment of the present invention. The location of the NORM state in relation to the other states of operation in the system can be seen in FIG. 6. The NORM state is the state of the circuit for high load continuous conduction down through lower load currents and subsequent discontinuous operation. As the load current continues to decrease, the circuit stays in the NORM state until a certain number of clock pulses have been skipped without a new cycle being initiated and the integrator circuit indicates that the output is reasonably close to its regulated value, or equivalently, if a certain time passes without a new cycle being initiated and the integrator circuit indicates that the output is reasonably close to its regulated value. When this occurs, the circuit moves into the STDBY mode of operation.

It should be noted that during the NORM mode of operation, the two capacitors in the auxiliary integrator are both diode connected in the auto-zero mode and both their current sources are turned on so that either one will be ready to start sensing the output voltage as described in the following section. The circuit stays in the NORM state until the switching has stopped for a certain time and a main integrator block says the circuit is close to regulation. The circuit then moves into the STDBY state.

Figure 8:
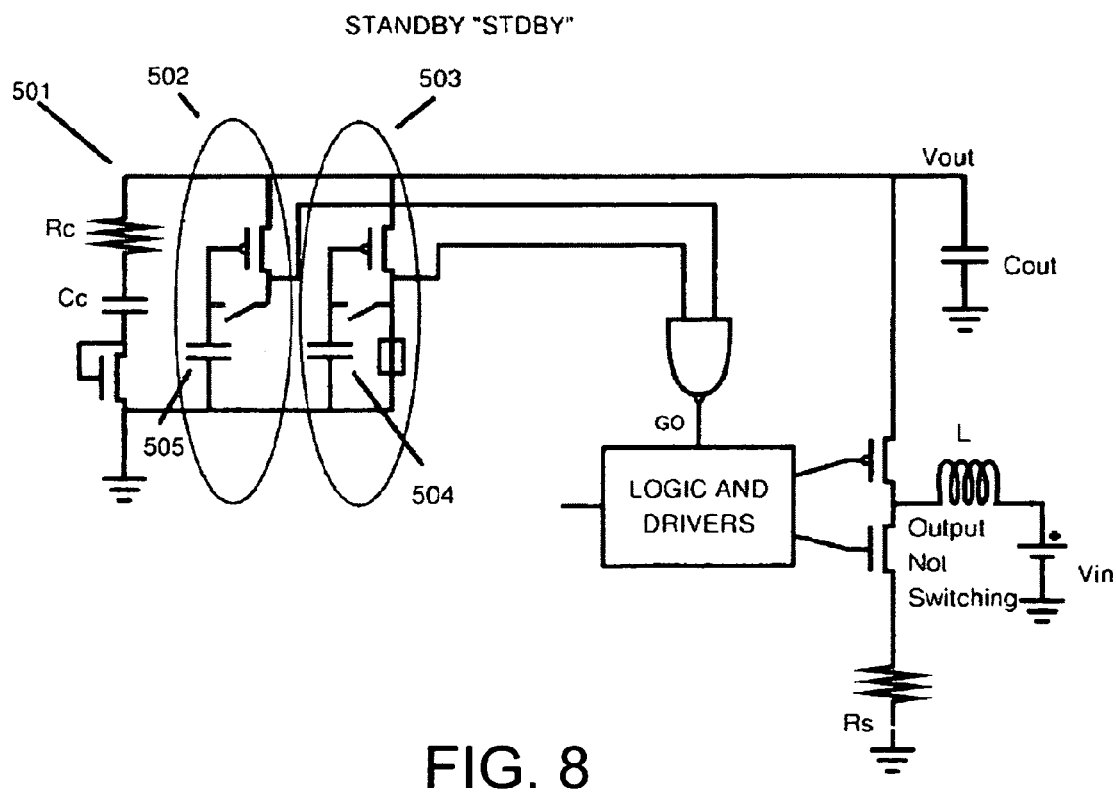
FIG. 8 shows a simplified schematic view of an exemplary switching regulator system in the STDBY mode of operation, in accordance with an embodiment of the present invention.

FIG. 8 shows a simplified schematic view of an exemplary switching regulator system in the STDBY state, in accordance with an embodiment of the present invention. The location of the STDBY state in relation to the other states of operation in the system can be seen in FIG. 6. In the STDBY state, the majority of the sub-circuits of the device are turned off, preferably all the non-essential ones. In the present embodiment, there are two capacitor/inverter circuits in the auxiliary integrator (similar to those of FIG. 5) that remain functional. One of these circuits is idle; its current source is turned off, its gate is connected only to a capacitor and its output is ignored. The other capacitor/inverter circuit is identical, but its current source is turned on. The voltage across a capacitor of the second circuit is almost exactly the same as the voltage across the first capacitor, but the drain of the first circuit's PMOS transistor amplifies any changes in the present output voltage compared to the output voltage during the time the capacitor/inverter circuit was last auto-zeroed. Other circuitry monitors the voltage of the PMOS drain to determine if the converter output voltage has dropped sufficiently to pull the circuit out of the STDBY state.

As shown in embodiment of FIG. 6 there are two paths out of the STDBY state. As just described, if the output voltage drops significantly enough so that the PMOS drain of the capacitor/inverter circuit used to sense the output voltage changes from a high state to a low state (this is the same as saying the GO signal transitions to a high state) then the circuit will immediately move into the REF_ON_HOT state in order to return back to the NORM mode of operation as expeditiously as possible.

The second shown path out of the STDBY state of FIG. 6 happens automatically after a certain time period. When the STDBY state was entered, a timer was started. In the present embodiment the timer is a 10 ms timer, but those skilled in the art in light of the present teachings will recognize that timers of other relatively long time periods would also be appropriate for this function. If the 10 ms time period ends and the GO signal has not transitioned to a high state, the circuit moves into a REF_ON_COLD state. The purpose for leaving the STDBY state periodically, in the present embodiment, is to ensure that parasitic leakages onto the capacitors used in the auxiliary integrator do not introduce offsets that will cause the state of the G signal to become inaccurate.

It should be noted that the terms REF_ON_HOT and REF_ON_COLD do not refer to actual temperature. The HOT moniker indicates that the output is falling out of regulation and the circuit should transition to the NORM mode of operation as quickly as possible. REF_ON_HOT is intended to denote a sense of urgency. The COLD label, in the REF_ON_COLD label, indicates that the output is still in regulation and there is no immediate need to pump more charge into the output capacitor.

Figure 9:
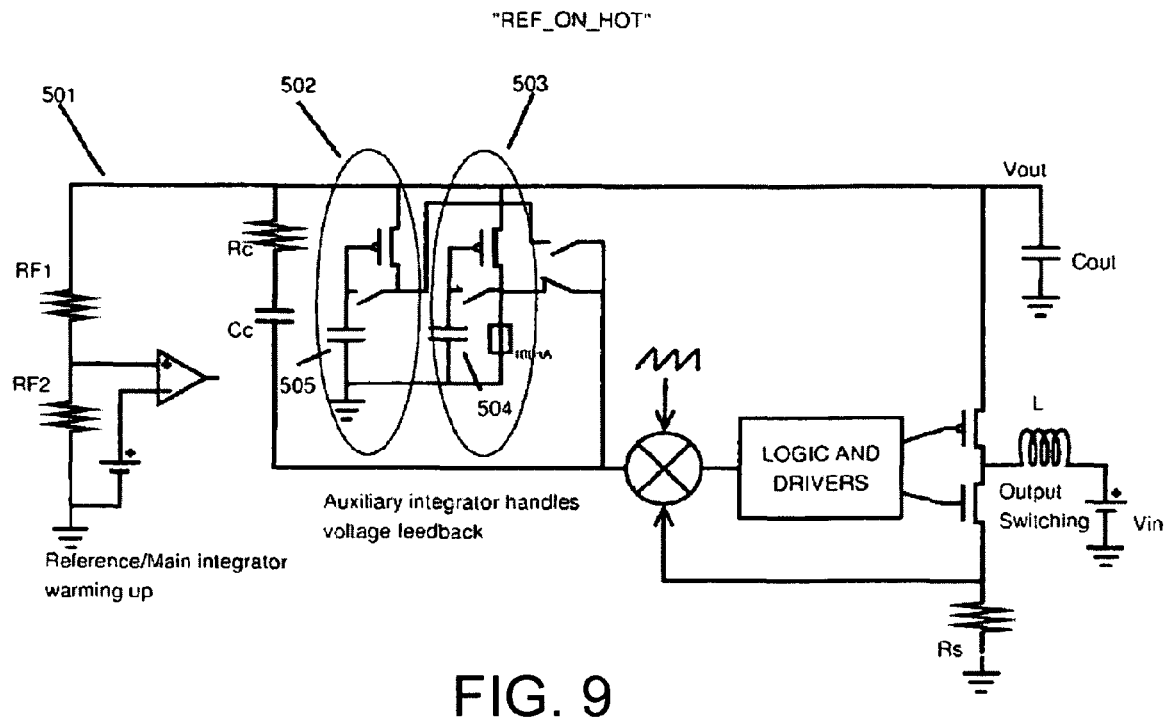
FIG. 9 shows a simplified schematic view of an exemplary switching regulator system during the REF_ON_HOT mode of operation, in accordance with an embodiment of the present invention.

FIG. 9 shows a simplified schematic view of an exemplary switching regulator system during the REF_ON_HOT mode of operation, in accordance with an embodiment of the present invention. The location of the REF_ON_HOT state in relation to the other states of operation in the system can be seen in FIG. 6. Upon entering the REF_ON_HOT state all systems in the circuit are turned back on, for example, without limitation, the voltage reference, feedback resistor, oscillator, integrator etc. However, even though the voltage reference and integrator have been turned back on, the voltage reference and integrator are typically not immediately able to work effectively because they require a finite amount of time for their voltages to stabilize. Other circuits such as, but not limited to, oscillators and current bias circuits can turn on much faster. Since the voltage reference and integrator are not ready to perform their appointed functions, the auxiliary integrator of the present embodiment handles the integrating function and voltage feedback during this time period in the present invention. Also, only one capacitor/inverter circuit is used here to regulate the output. Another capacitor/inverter awaits the next auto-zero cycle. After a period of time suitable for the voltage reference and integrator to fully turn on or after some signal indicating that the voltage reference and integrator are ready to change to the active state, the circuit moves out of the REF_ON_HOT state and into the NORM state.

Figure 10:
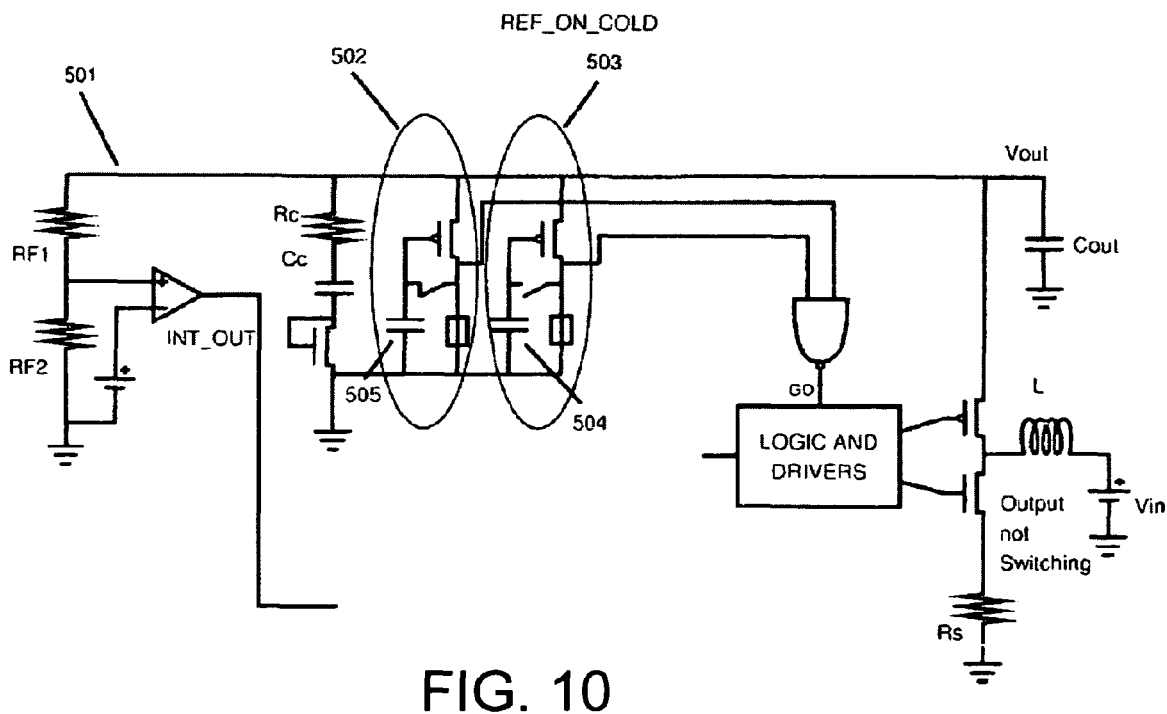
FIG. 10 shows a simplified schematic view of an exemplary switching regulator system in the REF_ON_COLD mode of operation, in accordance with an embodiment of the present invention.

FIG. 10 shows a simplified schematic view of an exemplary switching regulator system in the REF_ON_COLD mode of operation, in accordance with an embodiment of the present invention. The location of the REF_ON_COLD state in relation to the other states of operation in the system can be seen in FIG. 6. The REF_ON_COLD state is similar to the REF_ON_HOT state in that the reference is turned back on, but in the REF_ON_COLD state, the output is believed to be in regulation so there is no overwhelming need to return back to the NORM state immediately. The REF_ON_COLD state is entered from the STDBY state after a period of inactivity, for example, without limitation, 10 ms or some other suitable time period.

During the REF_ON_COLD state the reference will be turned back on, the unused capacitor in the auxiliary integrator will be put into its auto-zero mode, after the reference has stabilized the feedback resistor is turned on, and after a suitable delay the output of the integrator is polled in order to see if the regulator output voltage is above or below its desired value. If the regulator output voltage is above its desired value then the circuit returns to the STDBY state. If the regulator output voltage is below its desired value then the circuit returns directly to the NORM state.

In the REF_ON_COLD state, one switch (connected to the capacitor) in the auxiliary integrator is open and the other switch (connected to the other capacitor) in the auxiliary integrator is closed. However, during this state the regulator output is still being constantly monitored by the auxiliary integrator and if the GO signal transitions to a high state at any time during the REF_ON_COLD state, the circuit will return to the NORM state as quickly as possible through the REF_ON_ON_HOT state. In this case the circuit cannot progress directly to the NORM state because the turn-on status of the reference is unknown.

In the present embodiment, the main integrator in this invention serves multiple roles. During the NORM mode of operation, the integrator functions as an integrator in the voltage control loop of the PWM. During the REF_ON_COLD state, without the RC compensation network attached, the integrator functions as a comparator. In this sense, what was once providing an integration function before is now providing a voltage comparison function. Using the integrator circuitry as a comparator to check the output regulation allows the offsets in the signal path to be the same for the NORM state as they are for the REF_ON_COLD state, so there is generally not a situation where two different states disagree as to whether or not the output is in regulation.

In general, there is never a time when the circuit stops monitoring the output voltage of the converter. During the REF_ON_COLD, REF_ON_HOT and STDBY state, one of the capacitor/inverter circuits is always active. During the NORM state, the main integrator monitors the output and provides regulation.

Figure 11:
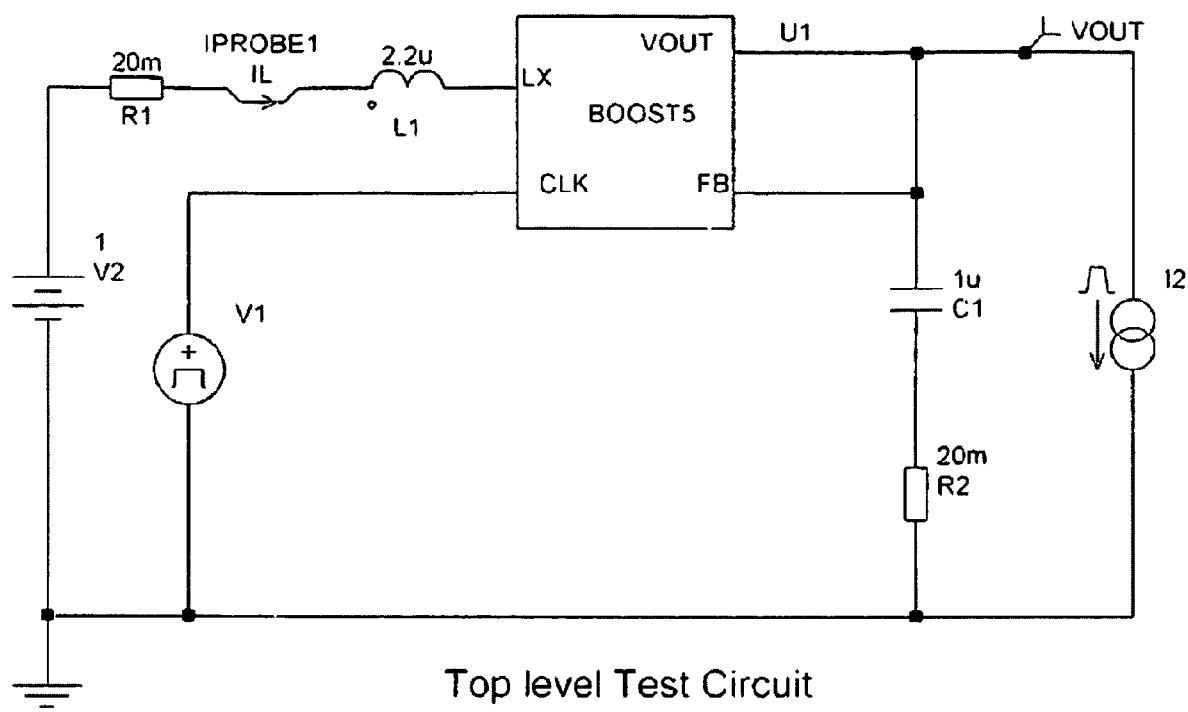
FIG. 11 is a top-level circuit diagram of exemplary switching regulator circuitry, in accordance with an embodiment of the present invention.

FIG. 11 is a top level circuit diagram of exemplary switching regulator circuitry, in accordance with an embodiment of the present invention. In order to motivate the general utility of the present invention, a schematic of the preferred embodiment is provided using ideal circuit elements, for clarity, and the resulting netlist is simulated with computer software that is particularly well suited for switching power supply circuits. The preferred embodiment is that of a 3 terminal boost converter but the idea can be applied to any type of switching power supply or regulating feedback loop. Some of the circuit blocks are self-explanatory but other non-traditional blocks will be explained in greater detail.

In FIG. 11 a voltage source V2 supplies the circuit through a parasitic resistance R1 and an inductor L1. The present embodiment comprises a 2 MHz clock V1. The output is connected to, without limitation, a load capacitor C1, a parasitic ESR resistor of capacitor C1, and a time dependent current load 12. This particular embodiment is designed to boost an input supply voltage of 1V up to 3V at an output pin VOUT; however other embodiments are not dependent on any particular VOUT/VIN ratio.

A boost block BOOST5 shows four pins LX, CLK, VOUT, and FB, not counting ground, which might seem contradictory with the earlier statement that the preferred embodiment is a 3-pin boost converter. However, as those skilled in the art will readily appreciate, there is no contradiction here because the CLK and FB pins are shown on this level in order to facilitate the small signal simulations. The actual integrated circuit implementation would typically have the clock (CLK) provided internally and the FB mode would be shorted internally to the VOUT mode thus leaving only three pins, LX, VOUT and GND, as indicated in FIG. 1.

Figure 12A:
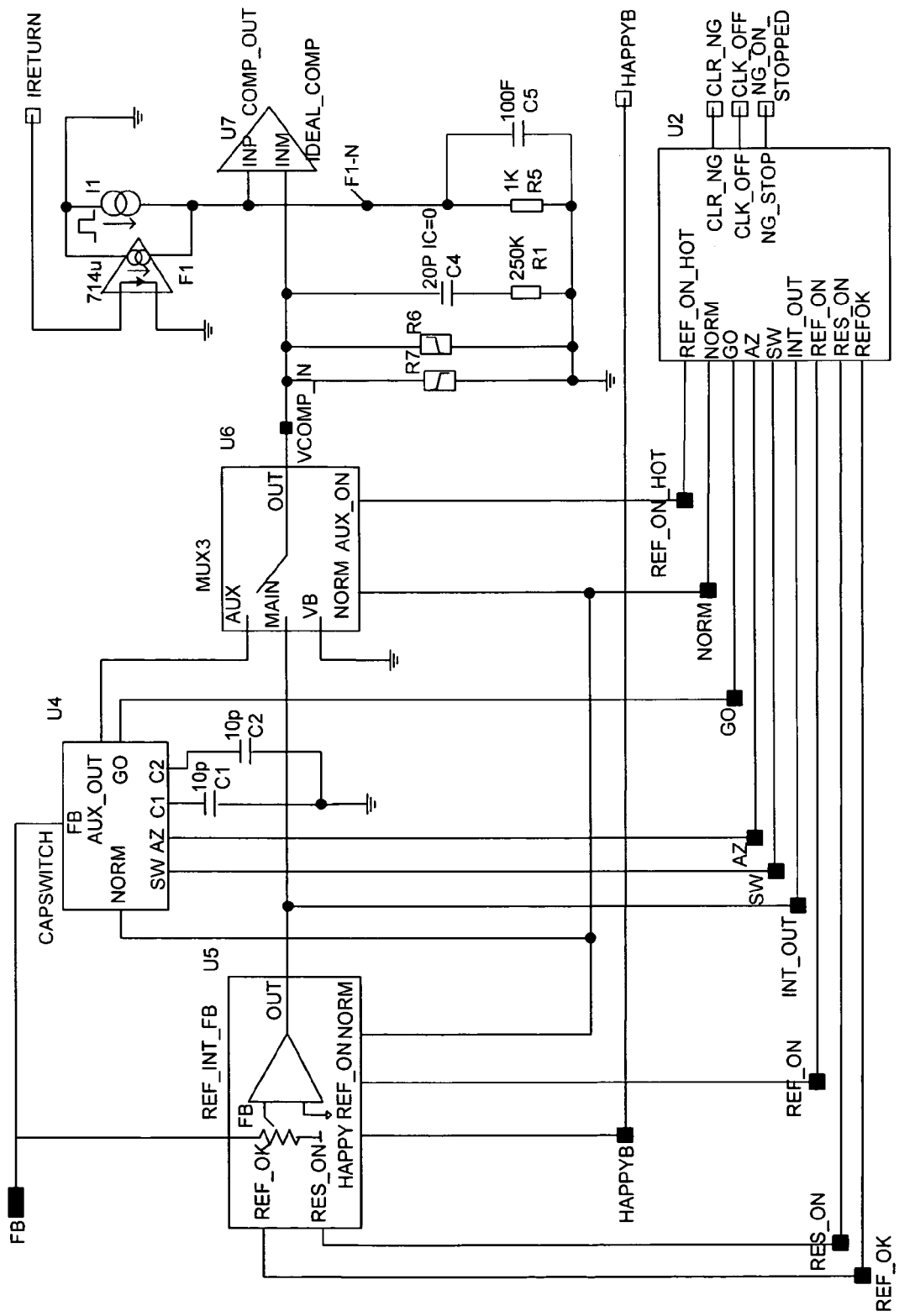
FIGS. 12A and 12b illustrate a sub-circuit schematic for an exemplary boost block BOOST5, in accordance with an embodiment of the present invention.
Figure 12B:
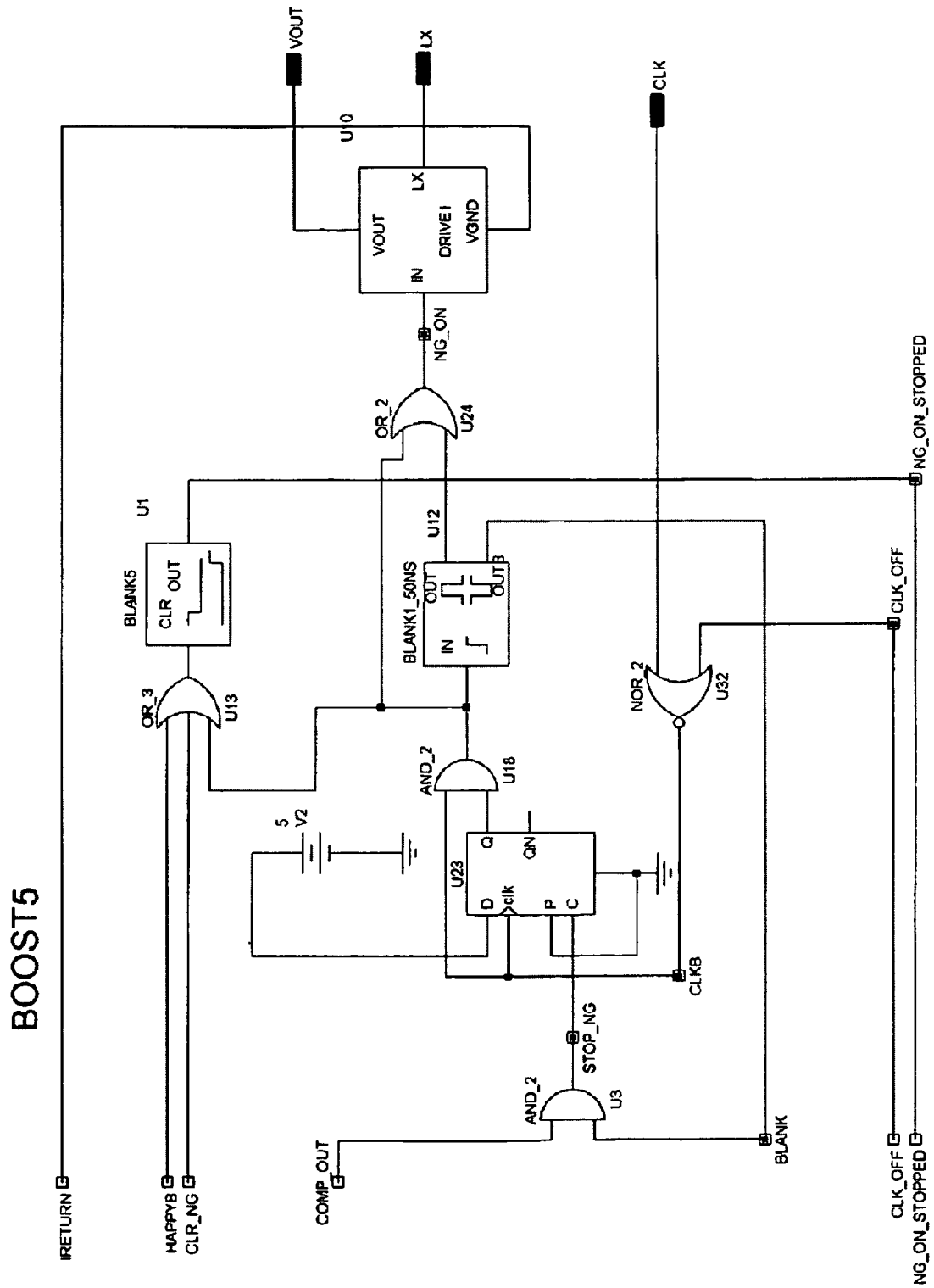

FIGS. 12A and 12B illustrate a sub-circuit schematic for an exemplary boost block BOOST5, in accordance with an embodiment of the present invention. The right hand half of the circuit (FIG. 12B) describes a standard boost converter comprising mostly prior art. Assuming that a DFF (D type flip flop) U23 is set and a Q signal is high, the output of an AND gate U18 will be high for as long as a CLKB signal is high. This sets up the maximum on time of an NMOS switch and assures that the NMOS switch will generally be off for a certain minimum time every cycle in order to let an inductor discharge into an output capacitor. The duty cycle of CLKB, the inverse of CLK, sets the maximum voltage gain that the boost converter can attain. The output of AND gate U18 drives a one shot U12. In the present embodiment, one shot U12 is a modified one shot that outputs a 50 nS pulse and its complement on every rising edge at an IN pin. The positive pulse is OR'd with the output of AND gate U18 in order to make a signal NG_ON that instructs the drive circuitry to turn on a large NMOS FET within a block DRIVE1, shown in detail by way of example in FIG. 13. Continuing with FIG. 12B, the complemented signal at OUTB of one shot U12 ensures that a STOP_NG signal will be disabled for a time interval determined by one shot U12. In switching power supply design, the technique of disabling a signal for some short time after a large FET is turned on or off is sometimes called "edge blanking". It is used to prevent the noisy signals produced by the turn off or turn on of a large FET from causing erroneous comparator transitions. One shot U12 provides edge blanking for the NG_ON signal and prevents DFF U13 from inadvertently being cleared by a transient spike due to switching noise.

Also shown by way of example in FIG. 12B is a timer block labeled BLANK5 that determines the time that a CLR signal remains low. When the CLR input remains low for an amount of time determined by BLANK5, an OUT signal goes high, signaling a potential start of the STDBY state. The BLANK5 block is not prior art and is specific to this invention.

The embodiment shown in FIG. 12A also comprises a reference, feedback network, and integrator (REF_INT_FB) block. The REF_INT_FB block includes a voltage reference, a feedback resistor used for sensing the regulator output voltage, the main integrator plus circuitry that determines if the regulator output voltage is within a certain percentage of its nominal value. If the REF_INT_FB block is on, all circuits are on.

Figure 13:
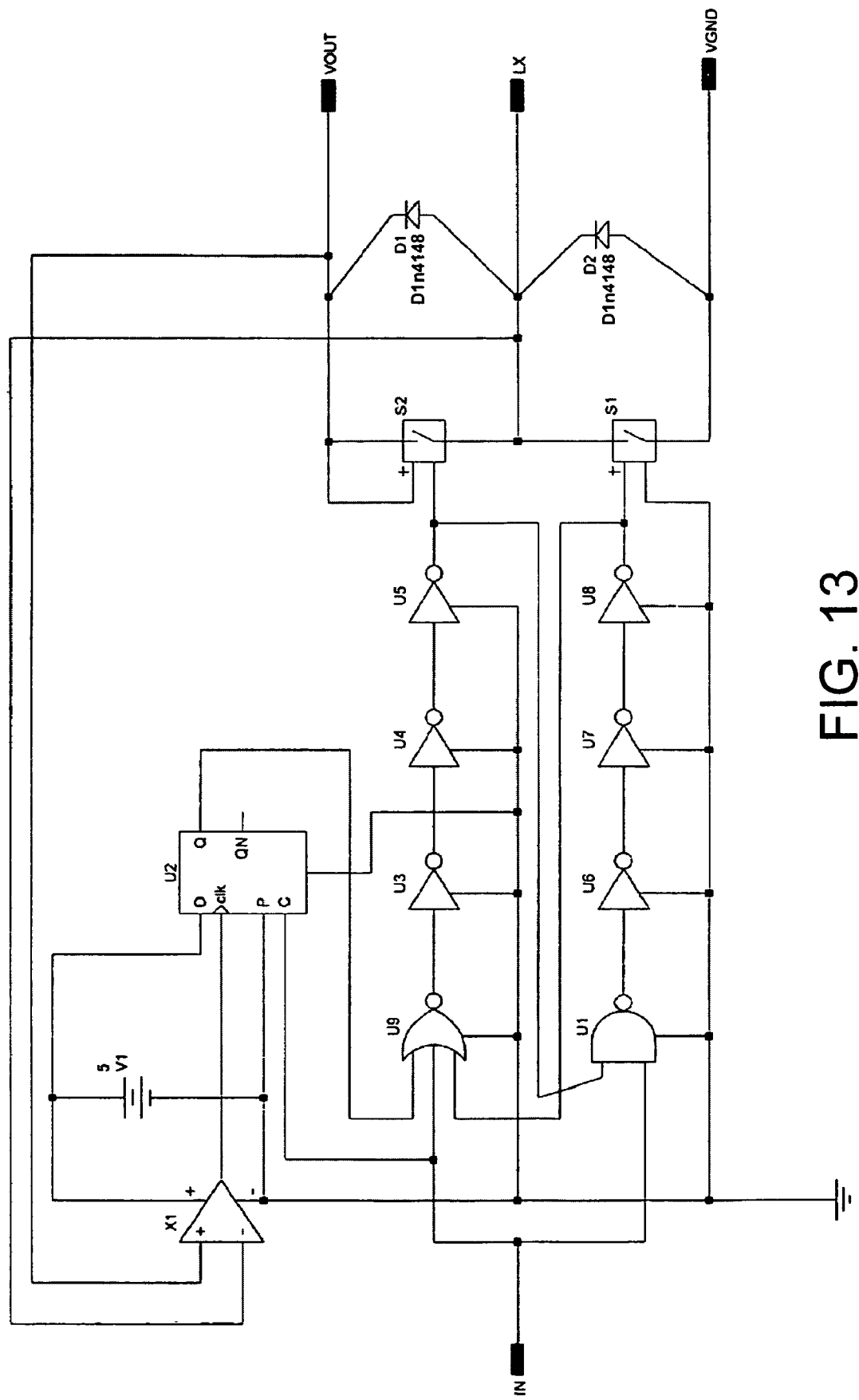
FIG. 13 shows a simplified schematic view of an exemplary FET driver and synchronous switch comparator, DRIVE1, in accordance with an embodiment of the present invention.

FIG. 13 shows a simplified schematic view of an exemplary FET driver and synchronous switch comparator, DRIVE1, in accordance with an embodiment of the present invention. When the large NMOS FET, represented by a switch S1, in FIG. 13 is turned on, current ramps up in the top-level inductor until one of two things happen. A PWM comparator U11 (FIG. 12A) may cause a COMP_OUT signal to go high which in turn causes the STOP_NG signal (FIG. 12B) to go high through AND gate U3 clearing DFF U23 and turning off the large NMOS in the DRIVE1 block, or the maximum on time, as defined by the CLK signal, may occur which will also turn off the large NMOS in the DRIVE1 block through a similar path.

Referring again to FIG. 12A, it should be noted that while the basic operating principles of a current mode boost converter are not novel they are outlined as follows in order to provide the background context in which the present embodiment of the invention is used. The regulator output voltage is senses through node FB and divided down by a resistor divider in the REF_INT_FB block. That divided down voltage is integrated versus the reference voltage by a transconductance gain block also located in REF_INT_FB. The output of the transconductance gain block, INT_OUT, drives an integrating RC network through the 3 input analog multiplexer MUX3 (U6). The integrating RC network is made up of components C4 and R1. Ideal non-linear devices R7 and R6 clamp the voltage at node VCOMP_IN to certain reasonable levels which, in part, also set the over current limit for the complete regulator circuit. The voltage at node VCOMP_IN represents the integrated error voltage (the error voltage is the difference between the reference and a divided down version of the regulator output voltage) for the regulator. That voltage is compared against a voltage ramp by an ideal comparator, U7, whose output, COMP_OUT, provides the PWM signal for the rest of the PWM drive circuitry shown in FIG. 12B. The voltage ramp at the positive input of U7 is made up of two components. One component is proportional to the inductor current when the large NFET is on (traditional current mode feedback) and the other component is an artificially produced voltage ramp used to provide a feature known as "slope compensation". Slope compensation is used to ensure the stability of the feedback loop for switching duty cycles that exceed 50%, it is well documented as prior art.

As previously described, the output node of the integrator, INT_OUT, shown in FIG. 12A, is connected to one terminal of a three input multiplexer, MUX3. The other two terminals of the multiplexer (MUX) can be connected either to a reference voltage (which may be GND as in this case) or to an auxiliary integrator output called AUX_OUT. During the STDBY mode of operation, the integrator RC network, capacitor C4 and a resistor R1, is connected to whatever voltage is at the VB pin of the 3 input MUX, U6. In this case VB is connected to GND so that during every STDBY period the integrator RC network is discharged GND. Whatever voltage is presented at the VB pin of U6 is the voltage that the integrator RC network will be charged to during the STDBY mode.

Figure 14:
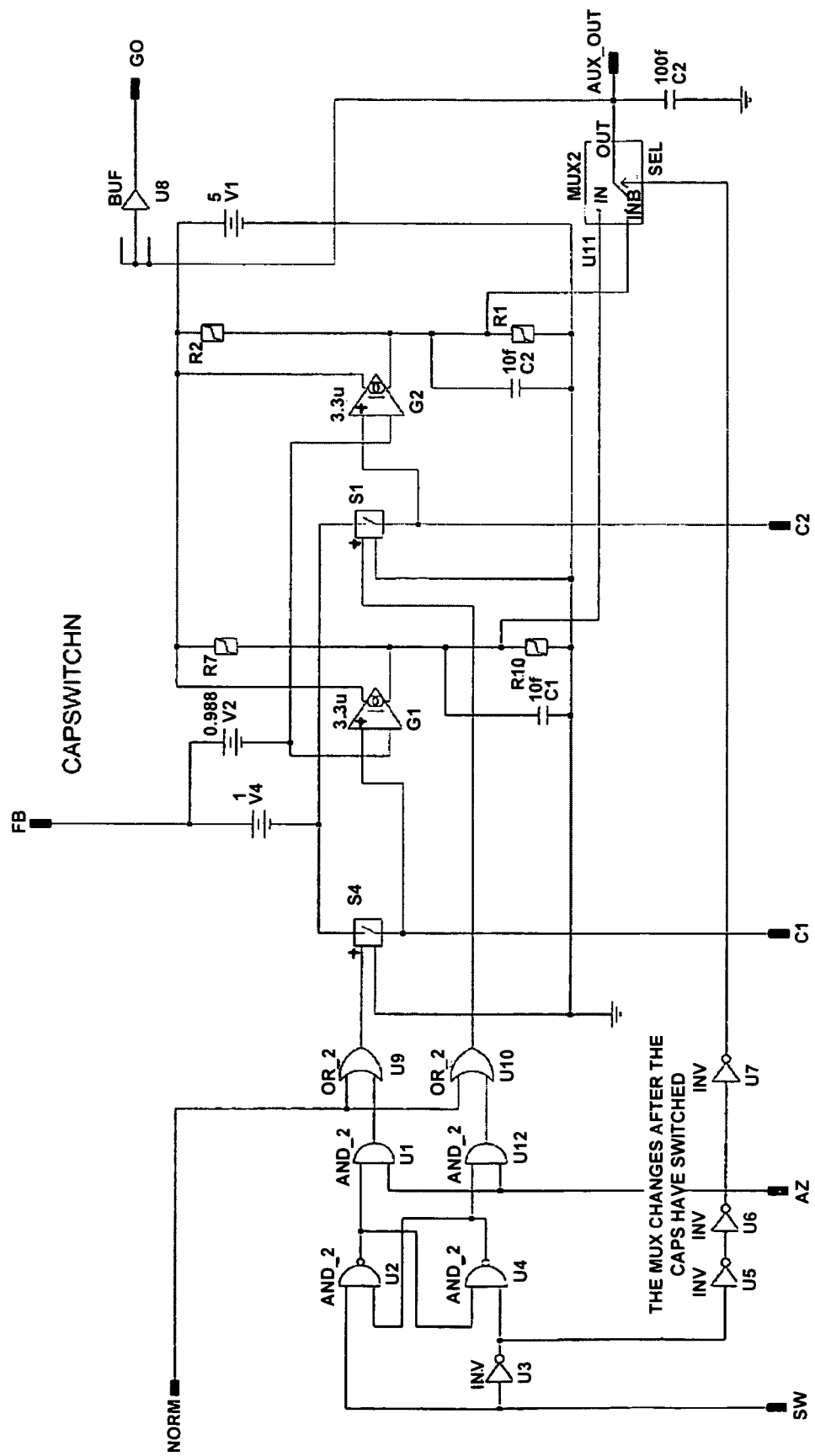
FIG. 14 shows a simplified schematic view of an exemplary auxiliary integrator/comparator, in accordance with an embodiment of the present invention.

FIG. 14 shows a simplified schematic view of an exemplary auxiliary integrator/comparator, called CAPSWITCHN, in accordance with an embodiment of the present invention. A transistor level description of this block will be included later on in this disclosure. CAPSWITCHN is the high-level circuit implementation of the simplified circuitry shown in FIG. 5. In the CAPSWITCHN block, the function of the PMOS transistors shown in FIG. 5 are represented by ideal transconductance blocks, G1 and G2. The actual transistor implementation more resembles the schematic shown in FIG. 5. In the present embodiment, CAPSWITCHN has two functions. During the STDBY state when the integrator, reference and feedback resistor are turned off to conserve power, CAPSWITCHN uses either capacitor C2 or C3, shown in FIG. 12A, and the transconductance stages connected to either capacitor C2 or C3 to monitor the output voltage of the switching regulator in order to determine whether or not the switching regulator is still in regulation. If the output is found not to be in regulation, the second function of CAPSWITCHN is to provide the voltage integrated signal into the PWM comparator until a main integrator block, REF_INT_FB, is prepared to provide the integrated signal.

In the present embodiment, capacitors C2 and C3 are connected to CAPSWITCHN so that one capacitor is always actively sensing the output voltage even if the other capacitor is in the auto-zero configuration or disconnected from the rest of the circuit. At the beginning of the STDBY state, a freshly auto-zeroed capacitor takes over the output monitoring function from the capacitor that was monitoring it in the previous STDBY state. If the previous state was the NORM state, it does not matter which capacitor is chosen for the output voltage monitoring function since both capacitors are auto-zeroed simultaneously during the NORM state. An SW signal determines which capacitor will be used to sense the converter output voltage. The SW signal toggles its state every time the circuit enters the STDBY state. The capacitor/inverter circuits are only allowed to be auto-zeroed when an AZ signal is high or when the NORM signal is high. The NORM signal overrides the AZ signal and forces both capacitor/inverter circuits into the auto-zeroed configuration.

If, during the STDBY state, the capacitor in sensing mode, either capacitor C2 or C3, senses a significant drop in the output voltage. The GO signal drives high indicating that the circuit must transition into the NORM mode of operation. The voltage reference, integrator and feedback resistor are turned back on at this point, but they are not connected into the signal path because their voltages have not yet reached equilibrium. Therefore, during this state, denoted by REF_ON_HOT in the same diagram, the feedback path is maintained through the AUX_OUT pin of CAPSWITCHN, as shown in FIGS. 12 and 14. The transconductance of the simple gain stage in CAPSWITCHN is designated to mimic the transconductance of the main integrator REF_INT_FB divided by the feedback resistor ratio. In this way, the AC gain of the loop during the REF_ON_HOT state, is approximately the same as the AC gain during the NORM mode of operation. In the present embodiment, the transconductance of the REF_INT_FB block is 10 umhos, and the feedback ratio is 3, so the transconductance of the inventor stages in CAPSWITCHN is 3.3 umhos; however, those skilled in the art will readily calculate the proper values depending upon the design of the particular implementation.

Referring again to CAPSWITCHN in FIG. 14 there are two voltage sources, V4 and V2 used as voltage references. The capacitors used to store the output voltage information, C2 and C3, are charged to the regulator output voltage minus voltage source V4 through switches S1 and S4 during their auto-zeroing period. However, when actively monitoring the regulator output voltage V2 is used as the reference. The difference between the two voltage references, 1.0V and 0.988V in the present embodiment, allows the output to drop during the STDBY state before the circuit is forced back into the NORM state. It also implies that immediately after coming out of the autozero mode the output of the transconductance amps should drive low thereby driving the GO signal low too. This is advantageous in that this hysteresis will prevent the circuit from immediately returning to the NORM state (through the REF_ON_HOT state) after entering the STDBY state based on an erroneous low to high transition at the GO node that might be produced by noise or a switching transient if the hysteresis was not there. The voltage difference between V2 and V4 is 12 mV, which means that the output can drop 12 mV from the regulated value before the circuit is turned back on. The main integrator reference also has 4 mV of hysteresis built into it However, in the case of the integrator reference VOUT drop is 4 mV*3=12 mV, which is equal to the hysteresis that is built into the CAPWITCHN block.

The hysteresis built into the CAPSWITCHN block means that the regulator output voltage can decay by 12 mV from the beginning of the STDBY mode until the STDBY mode is ended by a low to high transition of the GP signal and the circuit moves into the REF_ON_HOT state. (Remember that if there is no low to high transition of the GO signal for the 10 mS during the STDBY state then the circuit will transition into the REF_ON_COLD state.) This means that there will be, in the best case, at least 12 mV of output voltage ripple during the STDBY mode. This is necessary and expected because by the nature of this invention the output voltage capacitor will have to supply any load with charge during the STDBY state and its voltage must necessarily droop while that is happening. If the above mentioned hysteresis were decreased to zero then the circuit would continuously move from NORM to STDBY to REF_ON_HOT then back to NORM over and over again. Any efficiency gains would be lost to the power overhead associated with switching between states.

The hysteresis built into the main integrator serves a similar purpose but for different states of operation than the hysteresis associated with the CAPSWITCHN block. During NORM operation the circuit is regulated to the higher of the two voltage references in the REF_INT_FB block (see FIG. 18). That is, the output voltage that will be used by the CAPSWITCHN block to auto-zero capacitors C2 and C3 (FIG. 12A) will be 12 mV higher than the critical output voltage that is used during the REF_ON_COLD state to determine if the output voltage has dropped out of regulation enough to justify returning to the NORM mode. So during STDBY mode, if the output voltage drops 12 mV before the 10 mS time limit is up then the circuit is instructed to return to the NORM mode (by way of the REF_ON_HOT mode). If, after being in STDBY for 10 mS and progressing to the REF_ON COLD state, the regulator output voltage has fallen 12 mV the circuit will also be instructed to return back to the NORM state. In either case (STDBY to REF_ON_HOT to NORM or STDBY to REF_ON_COLD to NORM) the circuit allows for 12 mV of droop on the output voltage before returning to its NORM mode of operation.

Figure 15:
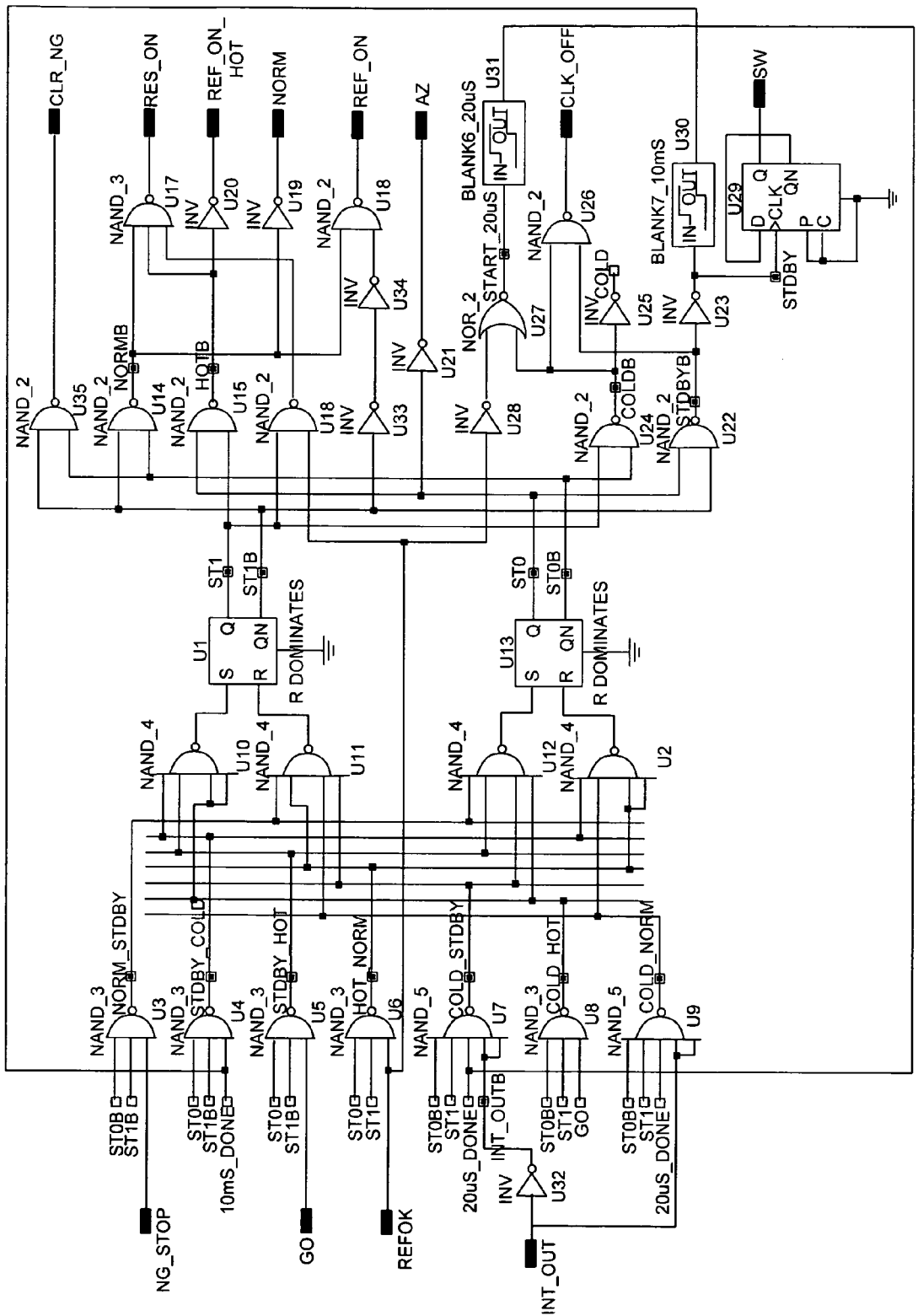
FIG. 15 shows a simplified schematic view of an exemplary state machine, STATE1, that drives the circuit through the various modes of operation, in accordance with an embodiment of the present invention.

FIG. 15 shows a simplified schematic view of an exemplary state machine, STATE1, that drives the circuit through the various modes of operation, in accordance with an embodiment of the present invention. The current state of the system is represented by the binary outputs of two SR flip flops designated U1 and U13. The circuitry to the left of the flip flops uses the existing state of the flip flops combined with signals from other parts of the regulator to force the flip flops to change from one state to the other. The circuitry to the right of the flip flops uses the current state of the flip flops to produce the regulator control signals that are proper for a particular state. Flip flop U29 is used to toggle the SW signal every time that the STDBY mode is entered effectively swapping the roles of the two capacitor/inverter circuits in the auxiliary amplifier, CAPSWITCHN. A timer, blank7.sub.—10 mS, U30, creates the 10 ms time period that signals the beginning of the REF_ON_COLD state. Another timer, blank6.sub.—20 uS, U31, is used to add a delay after the reference has stabilized during the REF_ON_COLD state in order that the reference output is fully settled and in order to give the auto-zeroing capacitor of CAPSWITCHN a chance to reach equilibrium. FIG. 16 is a table showing the values of the control signals for a particular state and also the required stimulus to drive the state machine from one state to the next. FIG. 17 is a list of each control signal and a description of its function.

Figure 18:
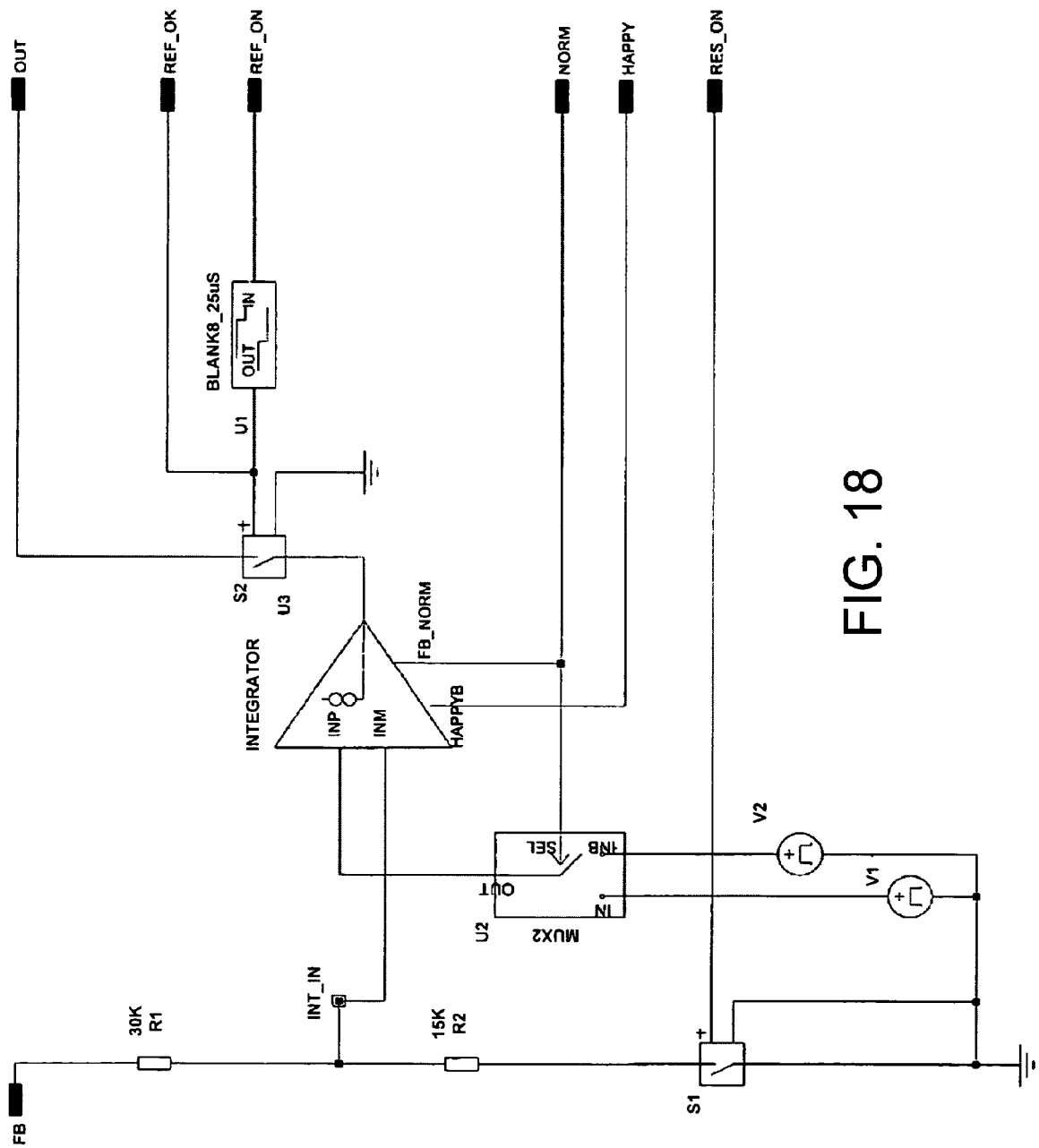
FIG. 18 shows a simplified schematic view of an exemplary reference, integrator and feedback resistor circuit, REF_INT_FB, with an embodiment of the present invention.

FIG. 18 shows a simplified schematic view of an exemplary integrator, reference and feedback resistor block, in accordance with an embodiment of the present invention. The present embodiment of this block comprises a 25 uS delay, U1, for the purpose of the simulation, to represent the finite start up time that the circuit will have when the circuit is implemented with actual transistors. In this situation the REF_OK signal will become valid 25 uS after the REF_ON signal is driven high. A HAPPY signal goes high when the integrator perceives that the circuit is close to regulation. A signal RES_ON turns the resistor feedback string on and off in order to conserve power.

There are two voltage references used in FIG. 18. The higher threshold is used during the NORM state, the lower threshold is used during the REF_ON_COLD state to check the regulator output voltage. This allows the regulator output voltage to drop to a lower voltage in the STDBY (and REF_ON_COLD) states than in the NORM state. By definition this sets up a minimum output voltage ripple. The ripple has the effect of increasing the amount of time between the moments when the switching regulator must return to the NORM state and consequently dissipate more power. If the ripple was set to a very small value then the circuit would switch between the NORM and STDBY states too often negating any power saving efficiencies that are the reason for developing this invention in the first place.

Figure 19:
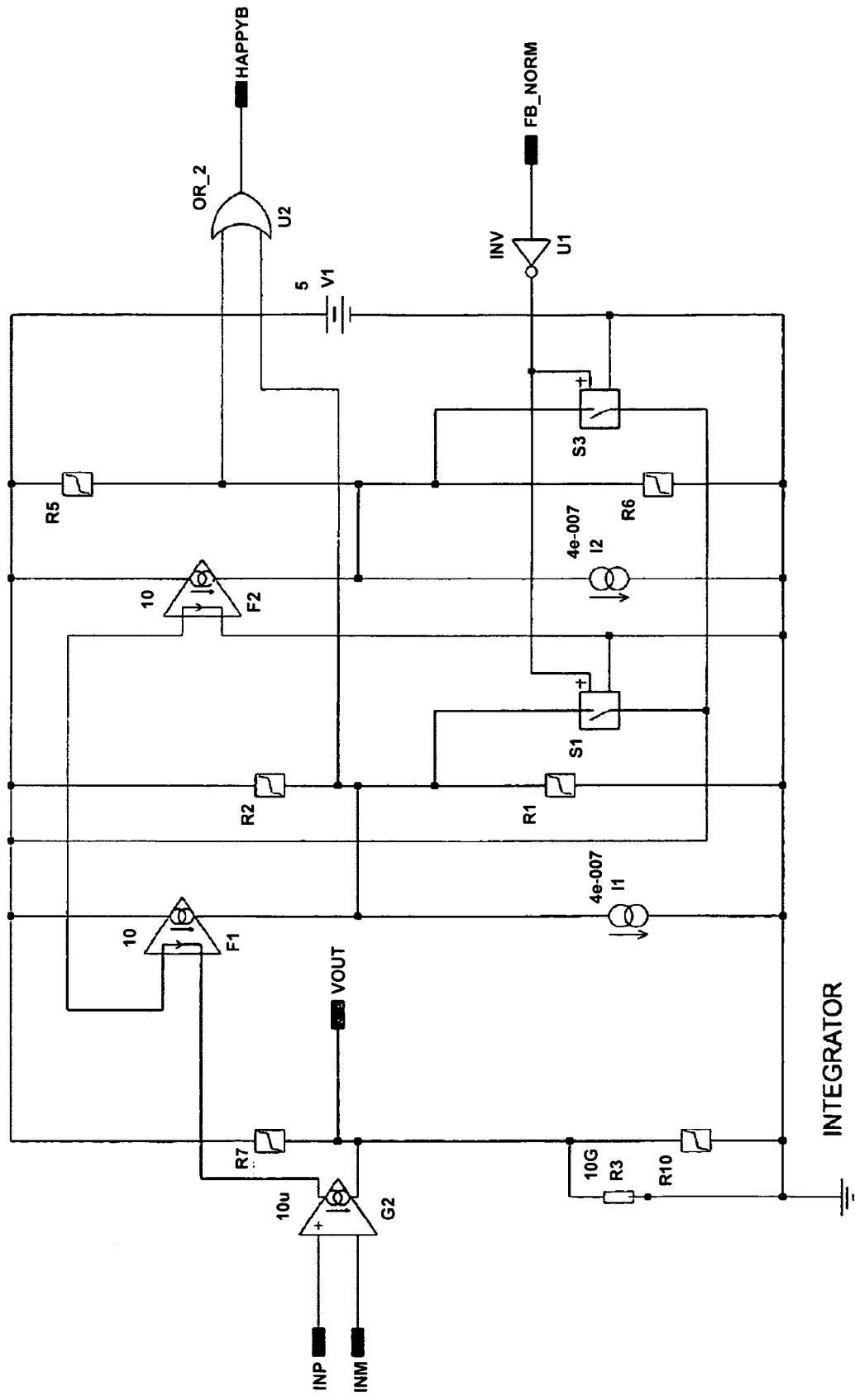
FIG. 19 shows a simplified schematic view of an exemplary integrator detail, INTEGRATOR, plus circuitry to determine if the regulated VOUT voltage is within a certain tolerance of a desired voltage with an embodiment of the present invention.

FIG. 19 shows a simplified schematic view of an exemplary integrator sub-cell, in accordance with an embodiment of the present invention. The present embodiment of the integrator sub-cell comprises circuitry that allows the circuit to determine if the converter output is near an intended regulation point. The extra current-to-current converters (F1 and F2) form a window comparator. If the output of either current-to-current converter F1 or F2 goes exceeds 400 nA, that indicates a change in the voltage at the input of a transconductance amplifier, G2, is larger than +/−4 mV (Take the current in current sources in I1 and I2, divide by 10 due to the gain of F1 and F2, then divide by 10 umhos due to the transconductance of G2.). This will force the HAPPYB signal high and prevent the circuit from moving into the STDBY state. This is done to ensure that the voltage on the auto-zeroed capacitor in the CAPSWITCHN block has been derived using a regulator output voltage that is truly in regulation. If the HAPPYB signal is high, the regulator output is not close to the regulated value, and the circuit stays in the NORM state until a time when the circuit is close to regulation. When the HAPPYB signal is low, it will allow the circuit to move into the STDBY state because the voltage stored on the holding cap, C2 or C3, will be the correct voltage. The choice of 4 mV for the threshold of the window comparator is somewhat arbitrary and it might be a different value for a particular design. When an FB_NORM signal is high, the window comparator is enabled, and during the STDBY state, the window comparator is disabled forcing the HAPPY signal low.

Figure 20:
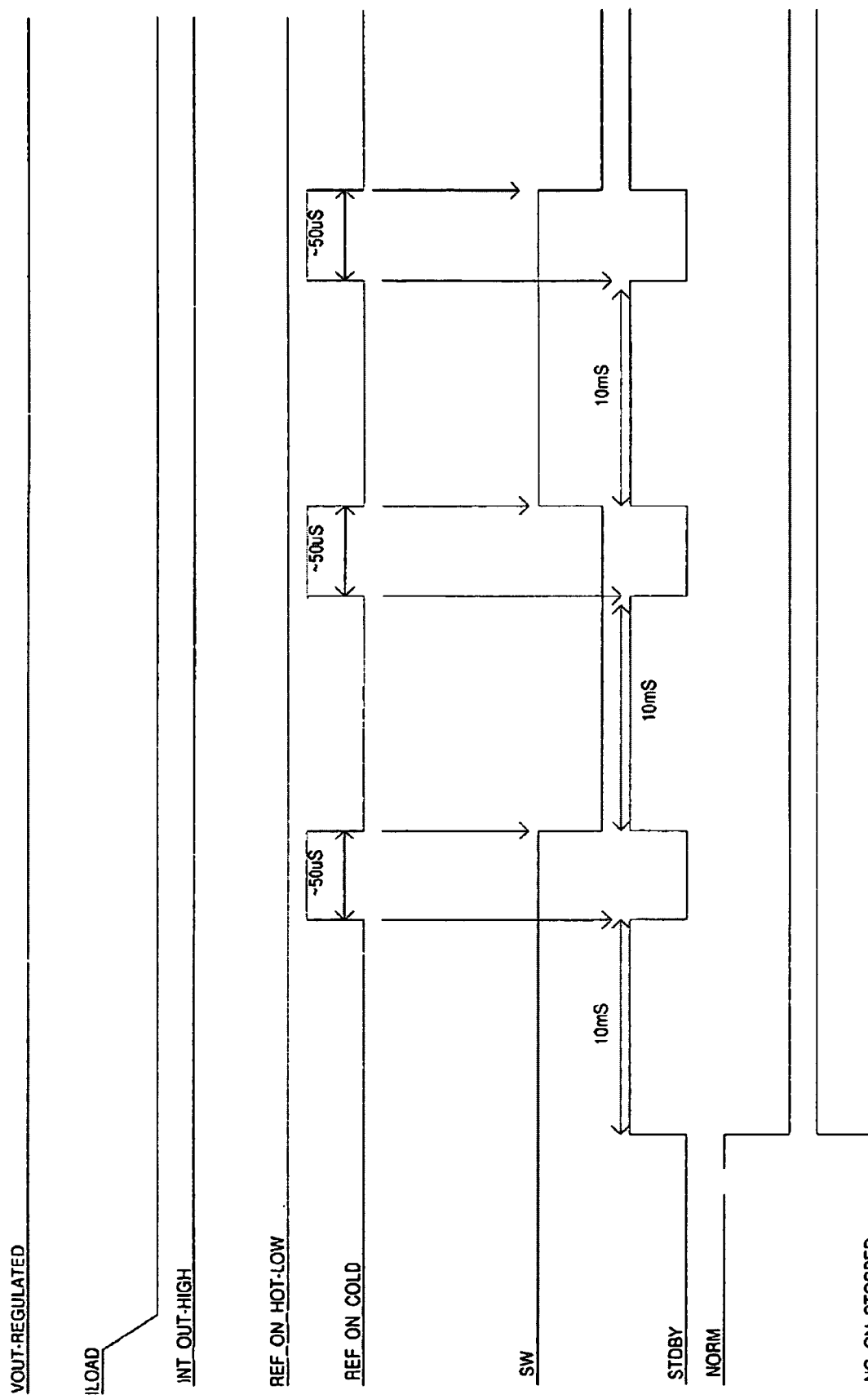
FIGS. 20 through 22 show exemplary timing diagrams of a switching regulator circuit in different modes of operation, in accordance with an embodiment of the present invention.
Figure 21:
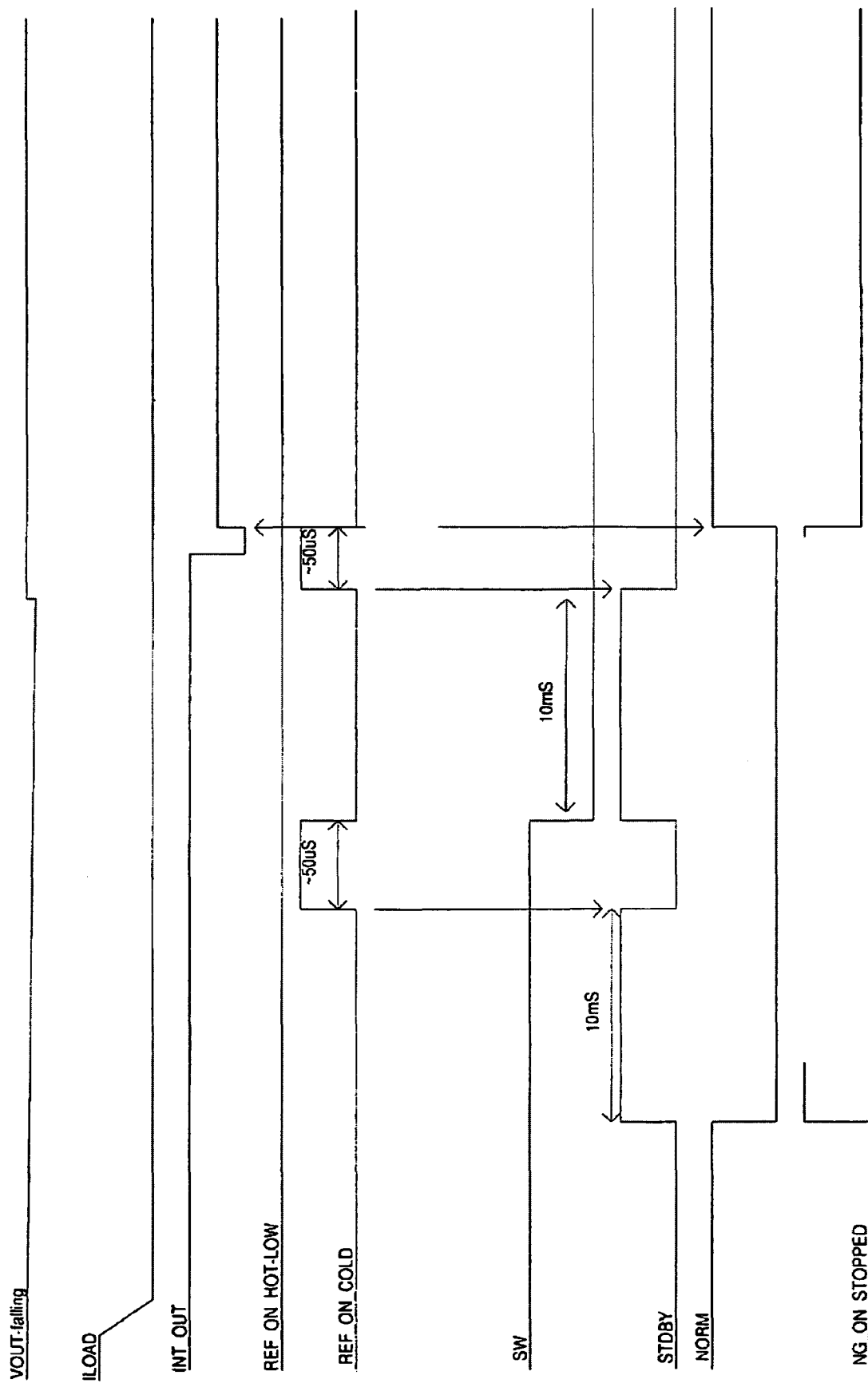
Figure 22:
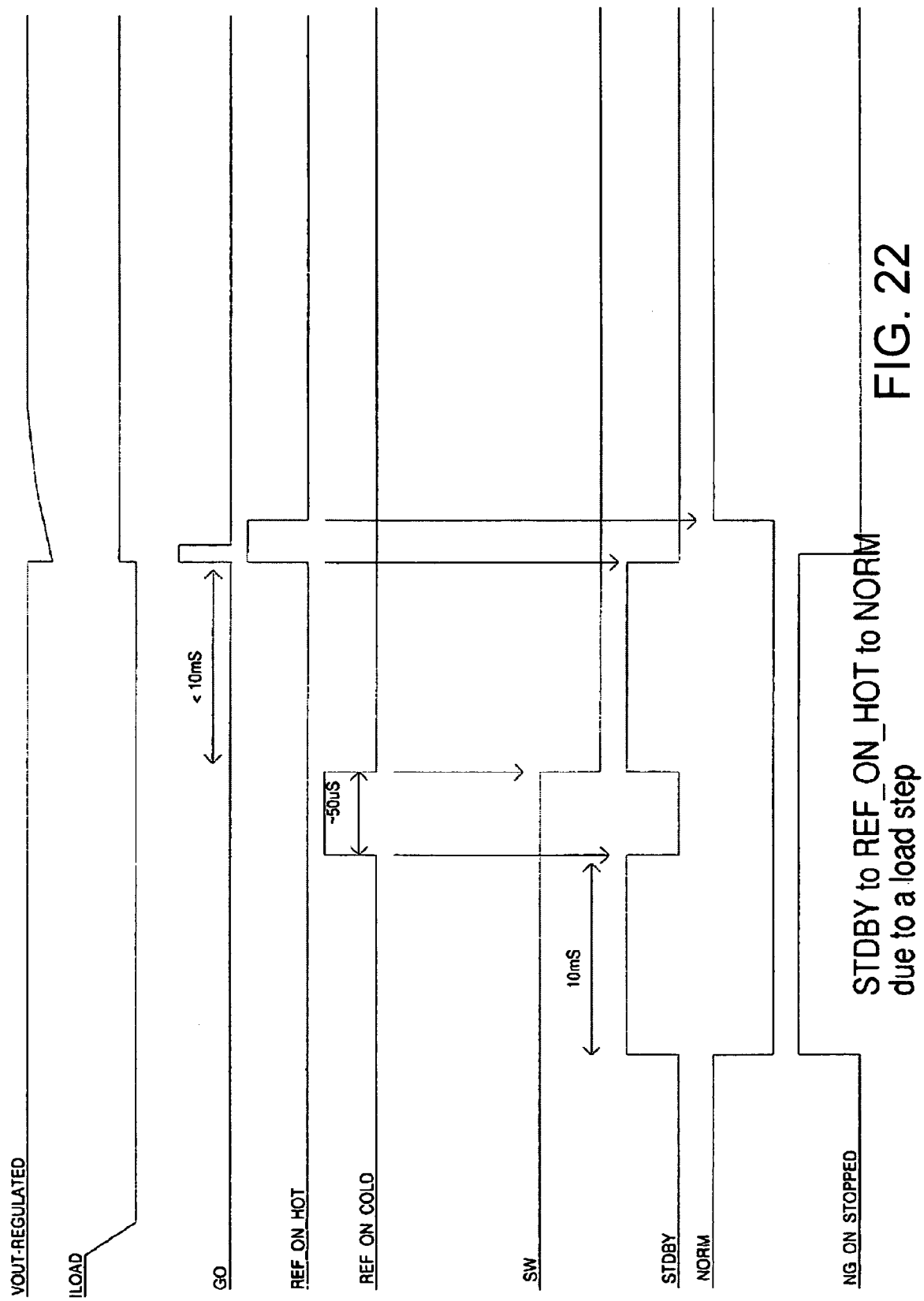

FIGS. 20 through 22 show exemplary timing diagrams of a switching regulator circuit in different modes of operation, in accordance with an embodiment of the present invention. FIG. 20 shows an exemplary timing diagram for STDBY operation where the output is always over regulation. FIG. 21 shows an exemplary timing diagram for STDBY operation where the output eventually drifts lower until it is under regulation. FIG. 22 shows an exemplary timing diagram for STDBY operation with an output move is due to an external load step. The diagrams are not drawn to scale in order to show the large dynamic range of time intervals used in the present embodiment of the invention (from 5 uS to 10 ms).

FIG. 20 shows the circuit continually in the STDBY or REF_ON_COLD mode of operation. At the extreme left of the diagram, a load current ILOAD moves from some high value to almost zero and stays there for the rest of the diagram. Sometime after load current ILOAD goes to zero a NG_ON_STOPPED signal goes high, the NORM signal goes low and the STDBY signal goes high. The circuit is now working in the STDBY state and the output voltage is primarily being maintained by the charge in the output capacitor. In the present example approximately 10 ms after the STDBY state starts, the circuit checks itself to make sure all the systems are properly calibrated in order to respond to any change in loading. The REF_ON_COLD signal goes high for .about.50 uS turning on the voltage reference and integrator comparator that, in this case, is used as a comparator. When the REF_ON_COLD signal falls the INT_OUT signal is polled to determine if the regulator output voltage (VOUT) is above or below its desired amount. In the case shown here, VOUT remains above regulation so INT_OUT is also high, signaling to the circuit that it may return to the STDBY state. During this state the unused capacitor in the CAPSWITCHN block has been in the auto-zero configuration. At this point, the circuit moves back into the STDBY state, swaps the roles of the capacitors C2 and C3 connected to CAPSWITCHN, and waits another 10 ms to repeat the cycle again. As long as VOUT remains in regulation, the circuit will continue to repeat this cycle indefinitely. However, eventually charge will leak off the converter output capacitor, which is illustrated in the next timing diagram, FIG. 21.

FIG. 21 shows explanatory waveforms for the preferred embodiment of the invention for a situation where the converter output voltage is slowly falling but has not fallen far enough to initiate a REF_ON_HOT state. At the left hand side of the diagram, the load current ILOAD once again starts at a high value then falls to a very low value. Sometime later the circuit enters the STDBY state in a manner identical to FIG. 20. However, in this example, the converter output voltage is slowly decaying. After 10 ms, the circuit enters the first REF_ON_COLD state, the reference is turned on, and state of the INT_OUT signal is polled. At this point in time, the INT_OUT signal is still high so the circuit returns back to the STDBY state as was also the case in FIG. 21.

Another 10 ms passes, and the circuit enters its second REF_ON_COLD state. At this time, the converter output voltage has fallen enough so that the INT_OUT signal is low at the end of the REF_ON_COLD state. At this point in time, the circuit moves directly back into the NORM state. There is no need for an intermediate state so that the regulation can be maintained while the voltage reference settles. In this situation the voltage reference has already been settled for a significant amount of time so the NORM mode of operation may resume immediately. The circuit will stay in the NORM state until the load current decreases to a point low enough to drive the circuit back into the STDBY state.

The situation where the converter output voltage falls out of regulation between the REF_ON_COLD states is shown in FIG. 22. This diagram starts in the same manner as FIGS. 20 and 21; the ILOAD decreases to a level such that the circuit goes into the STDBY state. Ten milliseconds later, the circuit enters the first REF_ON_COLD state and then returns to the STDBY state. However, less than 10 ms after returning to the STDBY state, the converter output voltage is pulled low by some external load step. The CAPSWITCHN circuit has been monitoring the output voltage during the STDBY state for this situation. The GO signal, produced by CAPSWITCHN, rises to a high level, which forces the circuit into the REF_ON_HOT state. During the REF_ON_HOT state the voltage feedback and integrating function is provided by the CAPSWITCHN block. At the end of the RE_ON_HOT state, after the voltage reference, integrator and feedback resistor have all been turned on and allowed to reach their final operating states, the circuit moves back into the NORM state. The circuit will stay in the NORM state until the load current decreases to a point low enough to allow the circuit back into the STDBY state.

Figure 23:
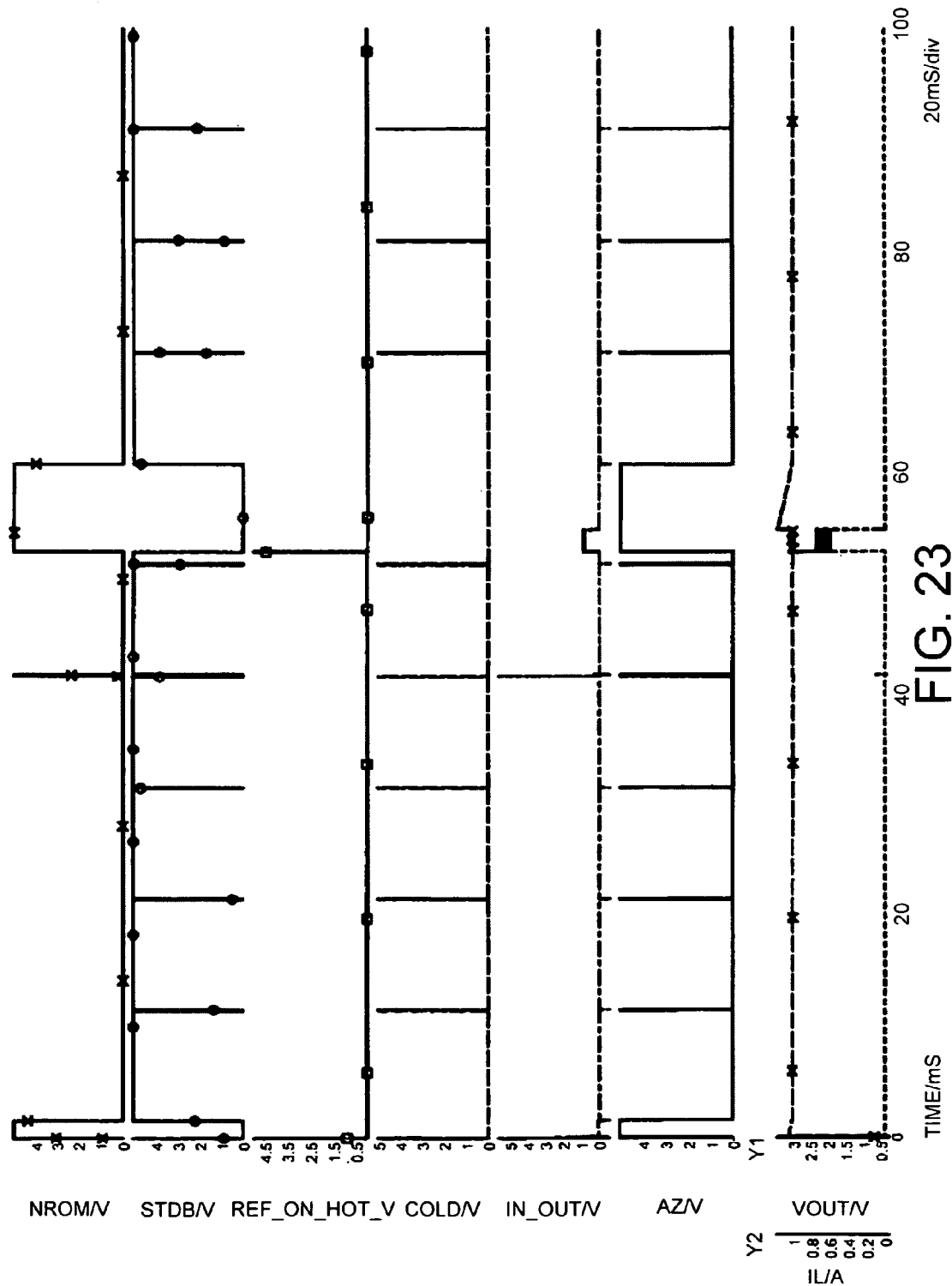
FIG. 23 illustrates exemplary simulation results showing the transient behavior of the invention over different loading conditions, in accordance with an embodiment of the present invention.

FIG. 23 illustrates exemplary simulation results showing the transient behavior of the invention over different loading conditions, in accordance with an embodiment of the present invention. In this simulation, the circuit starts up in a no load condition and the output voltage rises to three volts as soon as the output capacitor is charged. In the present example, the input voltage is 1V, the inductor size is 2.2 uH, the output capacitor is 1.0 uF, and there is 20 mohms of parasitic resistance in both the inductor and capacitor, as shown in FIG. 11. Approximately 2 mS after start up, the circuit moves into the STDBY state as can be seen by the NORM signal falling and the STDBY signal rising. After that time, the regulation is maintained by the charge stored on the output of the 1.0 uF capacitor. The output voltage is monitored by one of the capacitor/inverter sub-circuits in the CAPSWITCHN block. Every 10 ms, the REF_ON_COLD signal goes high indicating that the reference, feedback resistor and integrator are turned back on to check whether or not the output is still within regulation. For the first three REF_ON_COLD states of the simulation the output is still within the regulation limits so the circuit returns to the STDBY state. However, during the fourth REF_ON_COLD state, the output has fallen enough so that the circuit goes back into the NORM state for a brief time. It should be noticed that at this time point (approximately 42 mS), an inductor current IL is apparent on the lower graph.

After the output is brought back into regulation, the circuit returns to its STDBY state until there is a large load step on the output, for example, without limitation, 200 mA, at 53 mS. The drop in output voltage is detected by the CAPWITCHN circuitry immediately putting the circuit into the REF_ON_HOT state. During this time, all of the sub-circuits that were turned off during the STDBY state are now turned on, and the voltage regulation and integration function are handled by the CAPSWITCHN block. After a period of time suitable for all sub-circuit blocks to settle sufficiently, the circuit moves from the REF_ON_HOT state into the NORM state. In the NORM state the voltage regulation and integration function are provided by REF_INT_FB in conjunction with resistor R1 and capacitors C1 and C4. The circuit will stay in the NORM state as long as the load current is sufficiently high so as not to meet the criteria for returning to the STDBY state. In the case of this simulation, as seen in FIG. 23, the previous 200 mA load step turns off after several milliseconds and the circuit returns back to the STDBY state at approximately 63 ms. The circuit does not return to the STDBY state immediately after the load step is removed because the output voltage is not sufficiently regulated until approximately 63 mS. Because of the finite response time of the circuit, the output voltage jumps high when the load step is removed. Extra circuitry in the integrator, that generates the HAPPY signal, indicates that the output is still not sufficiently in regulation in order to move into the STDBY state. If the integrator did not qualify the status of the output voltage in this manner, the voltage stored on one of the CAPSWITCHN capacitors C2 or C3, as shown in FIG. 12A, would be indicative of an erroneous output voltage, and for that reason there would be a fixed error in the regulation during the STDBY state. In this example, where the output spikes up high at the end of a load step, the voltage stored on capacitor C2 or C3 would be indicative of an output voltage that was higher than the desired amount if the STDBY state was entered at the end of the load step instead of waiting until the output voltage had decayed to a value much closer to its desired value, for example, without limitation, 3V.

The rest of the simulation contains no load steps and the circuit spends most of its time in the STDBY state punctuated every 10 ms by the REF_ON_COLD state in order to check the regulation against the internal reference.

Figure 24:
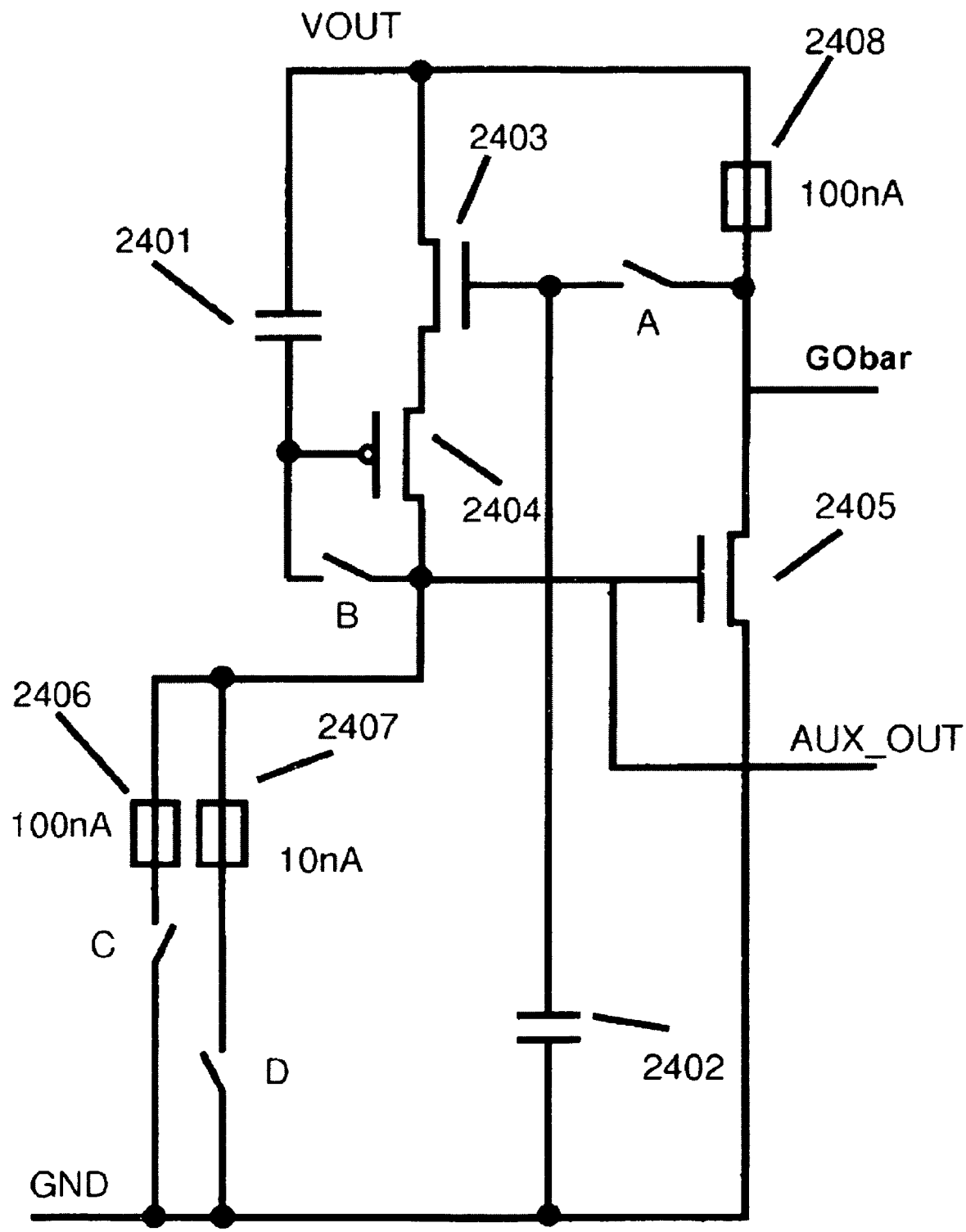
FIG. 24 shows a more detailed schematic view of an actual implementation of one of the capacitor/inverter circuits used in the auxiliary integrator where some of the components are still left as ideal devices in order to facilitate understanding of the concept with an embodiment of the present invention.

FIG. 24 shows an abstract transistor model one of the capacitor/inverter blocks seen previously in the CAPSWITCHN block (FIG. 14). FIG. 14 works well in the block level situation but it has several drawbacks in its transistor implementation, namely that its response is very slow and it does not slew the AUX_OUT node (FIG. 12a, 14) fast enough to avoid causing an unwanted drop in regulator output voltage when entering the REF_ON_HOT state.

When the state machine indicates that the circuit in FIG. 24 should be put in its auto-zero mode it closes switches, A, B, and C (D remains open). PMOS transistor 2404 is put into a diode connected configuration and the gate of NMOS transistor 2403 is driven by the output of an inverting gain stage comprised of NMOS transistor 2405 and current source 2048. The negative feedback induced by the inverting gain stage will cause the gate voltage of 2403 and 2404 to assume values so that the current flowing through the series combination of 2403 and 2404 will be exactly equal to the sum of the currents of current sources 2406 and 2407, in this particular case 100 nA.

When the state machine indicates that the circuit in FIG. 24 should actively monitor the output voltage of the regulator (VOUT) it opens switches A and B, while closing switches C and D. Now the current sources, 2406 and 2407, want to pull a total of 110 nA through 2403 and 2404 but the voltages stored on capacitors 2401 and 2402 are such that only 100 nA can flow through 2403 and 2404, hence the voltage at AUX_OUT falls and the voltage at GObar rises (assuming VOUT has not changed since the auto-zero interval. The addition of the 10 nA current source 2047 at the beginning of the active VOUT sensing phase assures that AUX_OUT will be low and GObar will be high when this phase is just started. Current source 2407 essentially adds an offset in one direction so that VOUT would have to fall slightly more negatively than it would otherwise do in order to raise the AUX_OUT voltage enough to bring the GObar node low thereby signaling that the regulator is out of regulation. The addition of current source 2047 thereby decreases the risk that the circuit will inadvertently sense itself going out of regulation due to the misinterpretation of some noise spike during the transition between states.

Let us now assume that after the circuit in FIG. 24 has been auto-zeroed the VOUT voltage starts to decrease. (Remember A is open, B is open, C is closed and D is closed.) The voltage across the capacitors 2401 and 2402 do not change but the potential difference between the gates of 2403 and 2404 does increase. In addition, the current through 2403 and 2404 wants to increase as the square of the voltage increase. This means that the AUX_OUT signal starts to increase quickly causing the GObar signal to fall quickly, that in turn signals the state machine (Statel in FIG. 15, 16, 17) that the output is under regulation and it is time to move into REF_ON_HOT mode.

In REF_ON_HOT mode the AUX_OUT node is connected to the compensation feedback network (R1, C4 of FIG. 12a) through a series of switches. The transistors 2404 and 2403, in conjunction with the voltage holding capacitors 2401 and 2402, now performs the function of feedback resistor, voltage reference and integrator gain block for the period of time that the circuit stays in REF_ON_HOT mode. What's more, the transconductance of 2403 and 2404 is non-linear, it rate of increase is larger as the VOUT voltage falls more and more. One useful aspect of this behavior is that the farther out of regulation the VOUT node falls the harder the "auxiliary integrator", 2403 and 2404, tries to push it back into regulation. This improves the transient load response of the regulator when responding to a load step that initially occurred during the STDBY mode.

Figure 25:
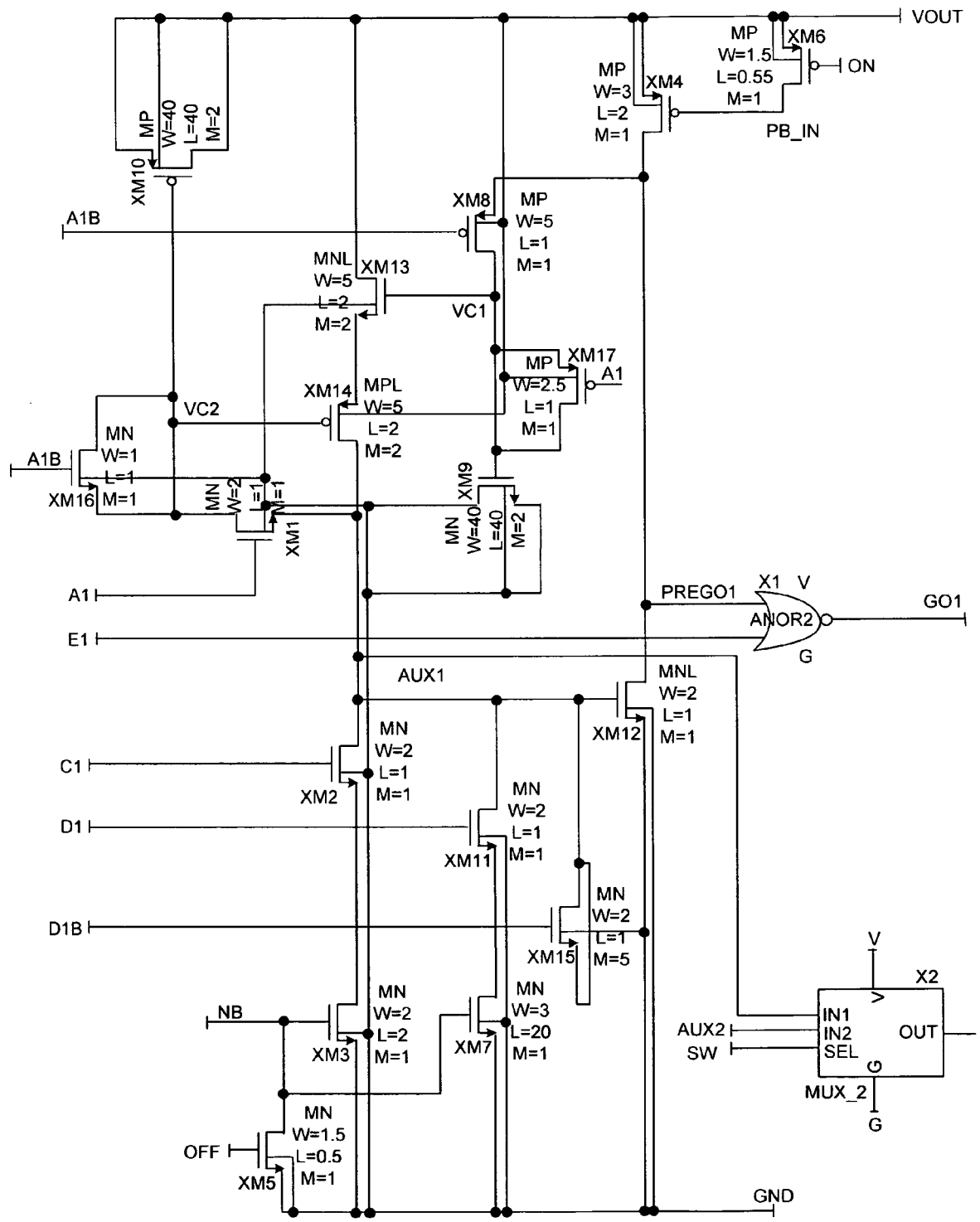
FIG. 25 shows the actual detailed schematic view of an implementation of one of the capacitor/inverter circuits used in the auxiliary integrator including charge compensating devices, transistor current sources and MOS capacitors with an embodiment of the present invention. Unless otherwise indicated illustrations in the figures are not necessarily drawn to scale.

A detailed schematic drawing of the actual implementation of the preceding function is shown in FIG. 25. Here the capacitors 2401 and 2402 are replaced by MOS transistors, XM15 and XM32. The active devices 2403 and 2404 are replaced by transistors XM36 and XM37. Current source 2408 is replaced by transistor current source XM27 which is driven by the appropriate bias voltage PB IN. The lower two current sources, 2406 and 2407 in FIG. 24, are replaced by NMOS transistors XM26 and XM30, both of whose gates are driven by an appropriate bias voltage, NB. Switches A, B, C, and D in FIG. 24 are replaced by transistors, XM31, XM24, XM25, and XM34 respectively. Several dummy devices are added to FIG. 25 to compensate for the injected charge inherent in a MOS device being used as a switch, namely XM39, XM22, and XM38. The use of dummy switches to compensate for charge injected by MOS switches is well known in the prior art.

Also shown in FIG. 25 is a two input multiplexer, X3, that is used to switch between the integrating output, AUX1, and a similar integrating output, AUX2, from an identical schematic block that is not shown in FIG. 25 in order to simplify the drawing. The two input NOR gate, X5, uses a signal E1 that is slightly delayed from A1 and A1B in order that the node PREGO1 has time to assume a high value just as the beginning of the state where the circuit block in FIG. 25 starts to actively monitor the output voltage i.e. transistors XM24, XM31 are open and transistors XM25, XM34 are closed. The GO1 signal is OR'd together with a signal G02 (not shown for simplicity) from a circuit identical to the circuit in FIG. 25. The output of GO1 OR GO2 becomes the "GO" signal mentioned earlier in the text and shown in the original CAPSWITCHN drawing (FIGS. 8, 10, 12a, 14).

Those skilled in the art will readily recognize, in accordance with the teachings of the present invention, that any of the foregoing components and/or system modules may be suitably replaced, reordered, removed and additional components and/or system modules may be inserted depending upon the needs of the particular application, and that the systems of the foregoing embodiments may be implemented using any of a wide variety of suitable components and system modules, and is not limited to any particular implementation details that those in the art will readily recognize suitable alternatives for in light of the teachings of the present invention.

Having fully described at least one embodiment of the present invention, other equivalent or alternative switching regulator according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A switching power supply circuit comprising:
   sub-circuits comprising:
     a voltage reference generator for providing a voltage reference;
     a feedback resistor for sensing an output voltage of the power supply, said feedback resistor supplying a fraction of said output voltage;
     an integrator for integrating over time a difference between said reference voltage and said fraction of said output voltage, said integrator providing an integrator output;
     a voltage ramp generator providing a voltage ramp;
     a comparator for comparing said integrator output and said voltage ramp, said comparator providing a pulse width modulated signal;
     a switching element receiving said pulse width modulated signal, said switching element modulating current through an inductor in order to provide a regulated output voltage; and
     a monitoring circuit for monitoring said pulse width modulated signal over a period of time, said monitoring circuit providing a logical low signal when said pulse width signal is absent over said period of time;
   a capacitor/inverter circuit comprising an inverter, a switch, and a capacitor connected to an input of said inverter and said switch, said switch being operative to allow a voltage to be stored on said capacitor, said voltage being indicative of said regulated output voltage, said inverter comprising a signal output, said signal output providing an out of regulation signal when a difference between said voltage and said regulated voltage is sensed and said switch is inoperative; and
   a standby control circuit comprising disabling circuits, said disabling circuits disabling said sub-circuits when said logical low signal is detected permitting the switching power supply circuit to operate at a minimum current, a switch control circuit controlling at least said switch, said switch control circuit controlling said switch to be inoperative when said logical low signal is detected, and enabling circuits, said enabling circuits re-enabling said sub-circuits when said out of regulation signal is detected allowing the switching power supply to provide said regulated output.

2. The switching power supply circuit as recited in claim 1, wherein said standby control circuit comprises an integrator switch, said integrator switch having inputs connected to said integrator output and said signal output, and an integrator switch output connected to said comparator, said integrator switch being controlled by said switch control circuit to select said signal output for a period of time when said enabling circuits re-enable said sub-circuits and to select said integrator output after said period of time.

3. The switching power supply circuit as recited in claim 2, further comprising a second capacitor/inverter circuit comprising a second inverter, a second switch, and a second capacitor connected to an input of said second inverter and said second switch, said second switch being operative to allow a second voltage to be stored on said second capacitor, said second voltage being indicative of said regulated output voltage, said second inverter comprising a second signal output, said second signal output providing a second out of regulation signal when a difference between said second voltage and said regulated voltage is sensed and said second switch is inoperative, and a third switch having inputs connected to said signal output and said second signal output and a third output for said out of regulation signal, said third output being connected to an input of said integrator switch, said switch control circuit controlling said switch, said second switch and said third switch allowing one of said capacitor or second capacitor to store said respective voltage or second voltage while said capacitor or second capacitor is operable to provide said out of regulation signal.

4. The switching power supply circuit as recited in claim 3, wherein after a determined time the switch control circuit reverses roles of said capacitor and said second capacitor.

5. The switching power supply circuit as recited in claim 4, wherein the switching power supply circuit is contained in a three pin IC package.

6. A switching power supply comprising:
   sub-circuits comprising:
      a feedback resistor that senses an output voltage of the power supply and supplies a fraction of the output voltage;
      an integrator that integrates over time a difference between a reference voltage and the fraction of the output voltage and provides an integrator output;
      a comparator that compares the integrated output and a voltage ramp and provides a pulse width modulated signal;
      a switching element that receives the pulse width modulated signal and modulates current through an inductor such that the power supply provides a regulated output voltage; and
      a monitoring circuit that monitors the pulse width modulated signal over a period of time and provides a logical low signal when the pulse width modulated signal is absent over the period of time;
   a capacitor/inverter circuit that comprises an inverter, a switch, and a capacitor storing a voltage indicative of the regulated output voltage, wherein the capacitor/inverter outputs a signal output that provides an out of regulation signal when a difference between the voltage and the regulated output voltage is sensed and the switch is inoperative; and
   a standby control circuit that disables the sub-circuits and controls the switch to be inoperative when the logical low signal is detected permitting the switching power supply operates at a minimum current, wherein the standby control circuit re-enables the sub-circuits when the out of regulation signal is detected allowing the switching power supply to provide the regulated output voltage.

7. The switching power supply of claim 6, wherein the capacitor is connected to an input of the inverter and the switch, and wherein the switch is operative to allow the voltage to be stored on the capacitor.

8. The switching power supply of claim 6, wherein the sub-circuits further comprise:
   a voltage reference generator that provides the voltage reference.

9. The switching power supply of claim 6, wherein the sub-circuits further comprise:
   a voltage ramp generator that provides the voltage ramp.

10. The switching power supply of claim 6, wherein the switching power supply operates in standby mode when the sub-circuits are disabled, and wherein the switching power supply operates in normal mode when the sub-circuits are enabled.

11. The switching power supply of claim 10, wherein the switching power supply transitions from the standby mode back to the normal mode through an intermediate state.

12. The switching power supply of claim 11, wherein the standby control circuit comprises an integrator switch that receives the integrator output and the signal output and outputs an integrator switch output, wherein the integrator switch is controlled to select the signal output for a second period of time when the sub-circuits are enabled and to select the integrator output after the second period of time.

13. The switching power supply of claim 12, wherein the intermediate state is REF_ON_HOT, wherein the REF_ON_HOT state is entered when the out of regulation signal is detected, and wherein the integrator switch selects the signal output during the REF_ON_HOT state and selects the integrator output in the normal mode.

14. The switching power supply of claim 12, wherein the intermediate state is REF_ON_COLD, wherein the REF_ON_COLD state is entered from the standby mode after a period of inactivity, and wherein the switching power supply returns to either the standby mode or the normal mode from the REF_ON_COLD state.

15. The switching power supply of claim 12, further comprising:
   a second capacitor/inverter circuit comprising a second inverter, a second switch, and a second capacitor storing a second voltage indicative of the regulated output voltage, wherein the capacitor/inverter outputs a second signal output that provides a second out of regulation signal when a difference between the second voltage and the regulated voltage is sensed and the second switch is inoperative.

16. The switching power supply of claim 15, wherein the second capacitor is connected to an input of the second inverter and the second switch, and wherein the second switch is operative to allow the second voltage to be stored on the second capacitor.

17. The switching power supply of claim 15, further comprising:
   a third switch that receives the signal output and the second signal output and outputs a third signal output for the out of regulation signal, wherein the switch, the second switch, and the third switch are controlled to allow either the capacitor or the second capacitor to store respective voltage or second voltage while corresponding capacitor or second capacitor is operable to provide the out of regulation signal.

18. The switching power supply of claim 17, wherein the capacitor and the second capacitor switch roles after a determined time.

19. The switching power supply of claim 6, wherein the switching power supply is contained in a three-pin IC package.

* * * * *